US012000357B2

(12) United States Patent
Rabhi

(10) Patent No.: US 12,000,357 B2
(45) Date of Patent: Jun. 4, 2024

(54) RECIPROCATING HEAT ENGINE WITH HOT CYLINDER HEAD AND COLD CYLINDER

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 0 days.

(21) Appl. No.: 18/107,811

(22) Filed: Feb. 9, 2023

(65) Prior Publication Data

US 2023/0304456 A1 Sep. 28, 2023

Related U.S. Application Data

(60) Provisional application No. 63/309,174, filed on Feb. 11, 2022.

(51) Int. Cl.

| | |
|---|---|
| ***F02G 1/053*** | (2006.01) |
| ***F02F 1/24*** | (2006.01) |
| ***F02F 3/00*** | (2006.01) |
| ***F02F 3/02*** | (2006.01) |
| ***F02G 1/055*** | (2006.01) |

(52) U.S. Cl.

CPC .............. *F02G 1/0535* (2013.01); *F02F 1/24* (2013.01); *F02F 3/0015* (2013.01); *F02F 3/02* (2013.01); *F02G 1/055* (2013.01); *F02G 2250/03* (2013.01); *F02G 2253/02* (2013.01); *F02G 2270/40* (2013.01); *F02G 2270/55* (2013.01)

(58) Field of Classification Search

CPC ........................................................ F02F 3/045

See application file for complete search history.

(56) References Cited

U.S. PATENT DOCUMENTS

| | | | | |
|---|---|---|---|---|
| 1,156,590 | A * | 10/1915 | Davol | 92/215 |
| 4,024,801 | A * | 5/1977 | Hudson | F02G 1/02 92/144 |
| 4,653,269 | A | 3/1987 | Johnson | |
| 2016/0252048 | A1* | 9/2016 | Rabhi | F02M 25/028 123/25 A |
| 2017/0074295 | A1* | 3/2017 | Rabhi | F02G 1/053 |
| 2017/0074398 | A1* | 3/2017 | Rabhi | F16J 1/12 |
| 2023/0258145 | A1* | 8/2023 | Rabhi | F02G 1/0445 92/172 |
| 2023/0331214 | A1* | 10/2023 | Harmon, Sr. | B60L 7/10 |

FOREIGN PATENT DOCUMENTS

| | | |
|---|---|---|
| EP | 3 350 433 B1 | 8/2019 |
| EP | 3 585 993 B1 | 4/2021 |
| FR | 3 032 252 B1 | 5/2018 |

(Continued)

*Primary Examiner* — Laert Dounis

(74) *Attorney, Agent, or Firm* — NIXON & VANDERHYE

(57) ABSTRACT

Reciprocating heat engine with hot cylinder head and cold cylinder includes a cooled cylinder casing which receives a cold cylinder covered with a lubricant film and in which a piston connected to power transmission moves in translation to form a variable-volume hot chamber with a hot cylinder head which is held applied but free to expand on the cylinder casing by cylinder head applying unit, while a hot crown is interposed between the chamber and the piston and is held applied but free to expand on the piston by crown applying unit, the piston including a cooled piston sealing ring which has a piston sealing unit.

41 Claims, 11 Drawing Sheets

(56) References Cited

FOREIGN PATENT DOCUMENTS

| | | | | | |
|---|---|---|---|---|---|
| FR | 3 071 869 | B1 | | 10/2019 | |
| GB | 2122722 | A | * | 1/1984 | ............ F02F 3/0023 |
| WO | 2016/120560 | A2 | | 8/2016 | |
| WO | WO-2017046480 | A1 | * | 3/2017 | ............. F02G 1/053 |
| WO | WO-2023152451 | A1 | * | 8/2023 | |
| WO | WO-2023152701 | A1 | * | 8/2023 | ........... F02G 1/0445 |

* cited by examiner

[Fig. 1]
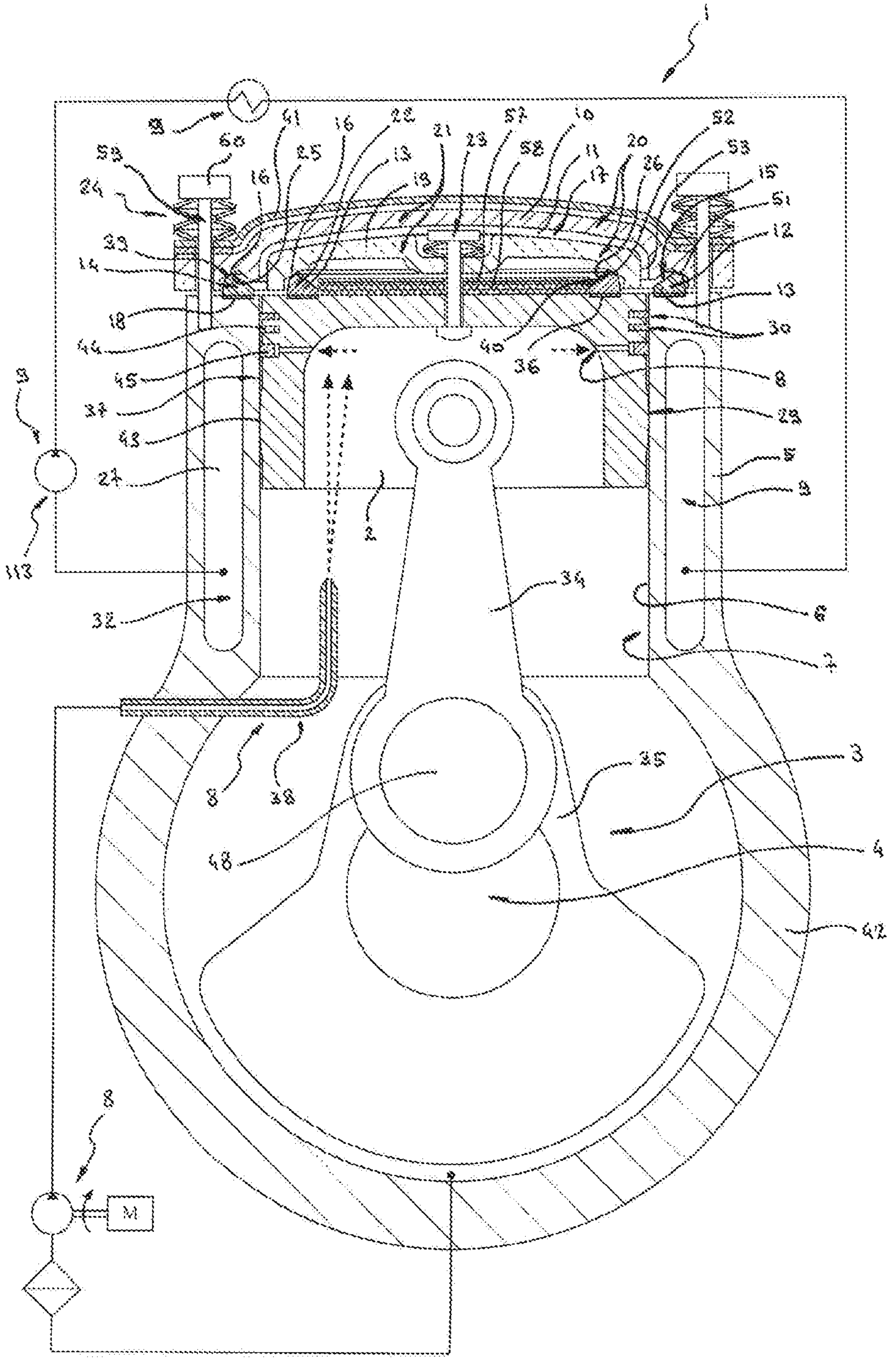

[Fig. 2]
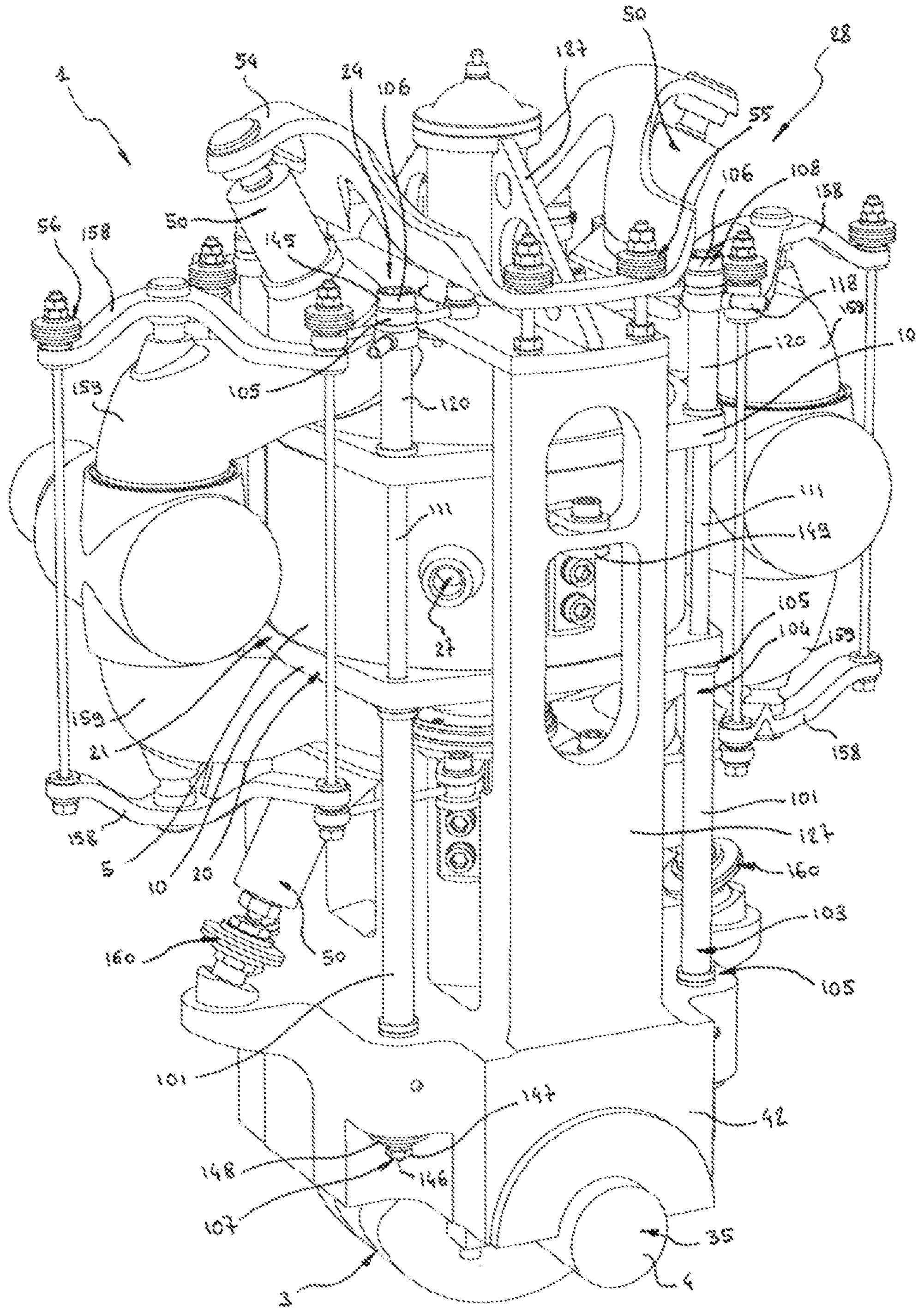

[Fig. 3]
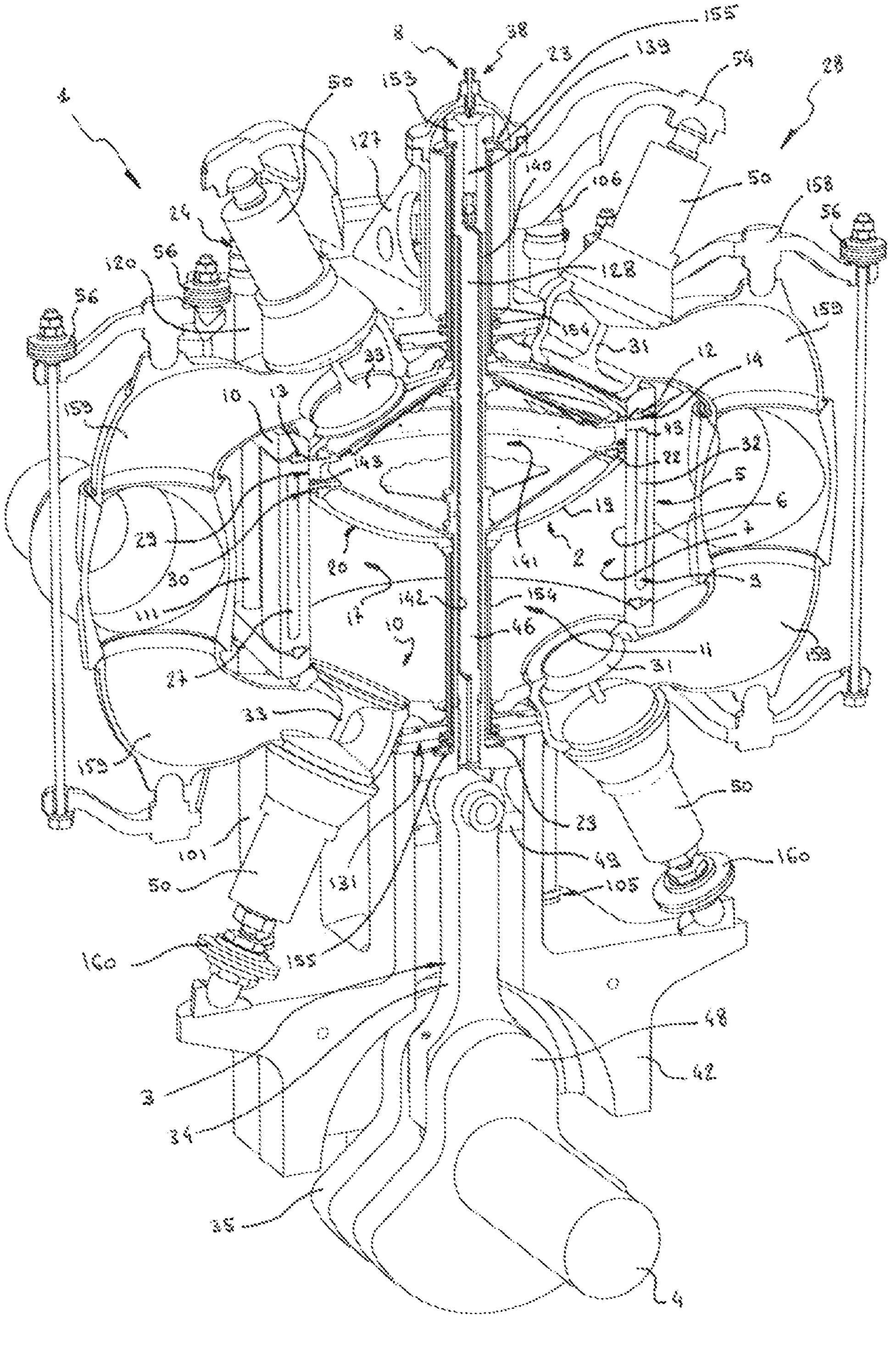

[Fig. 4]
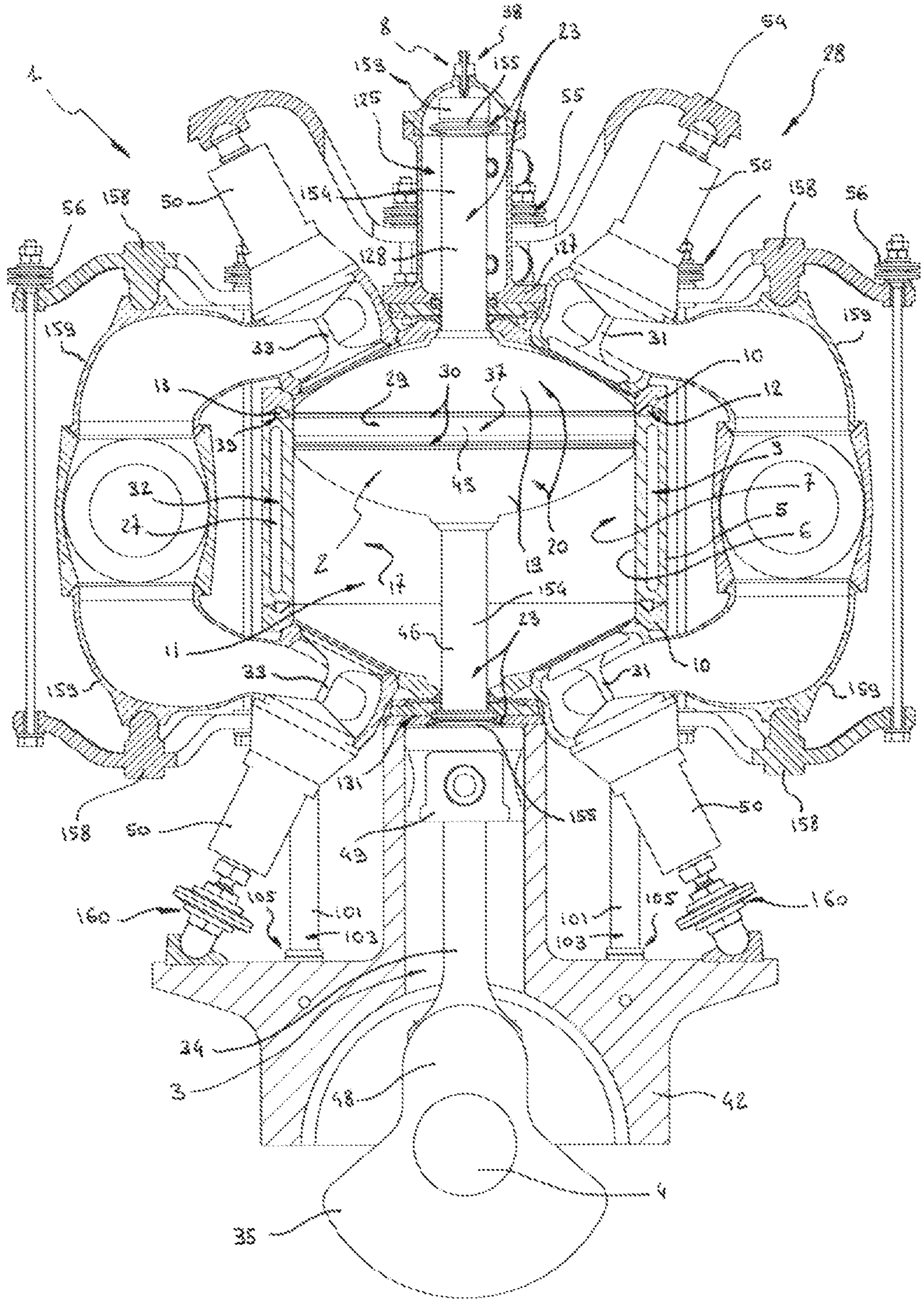

[Fig. 5]
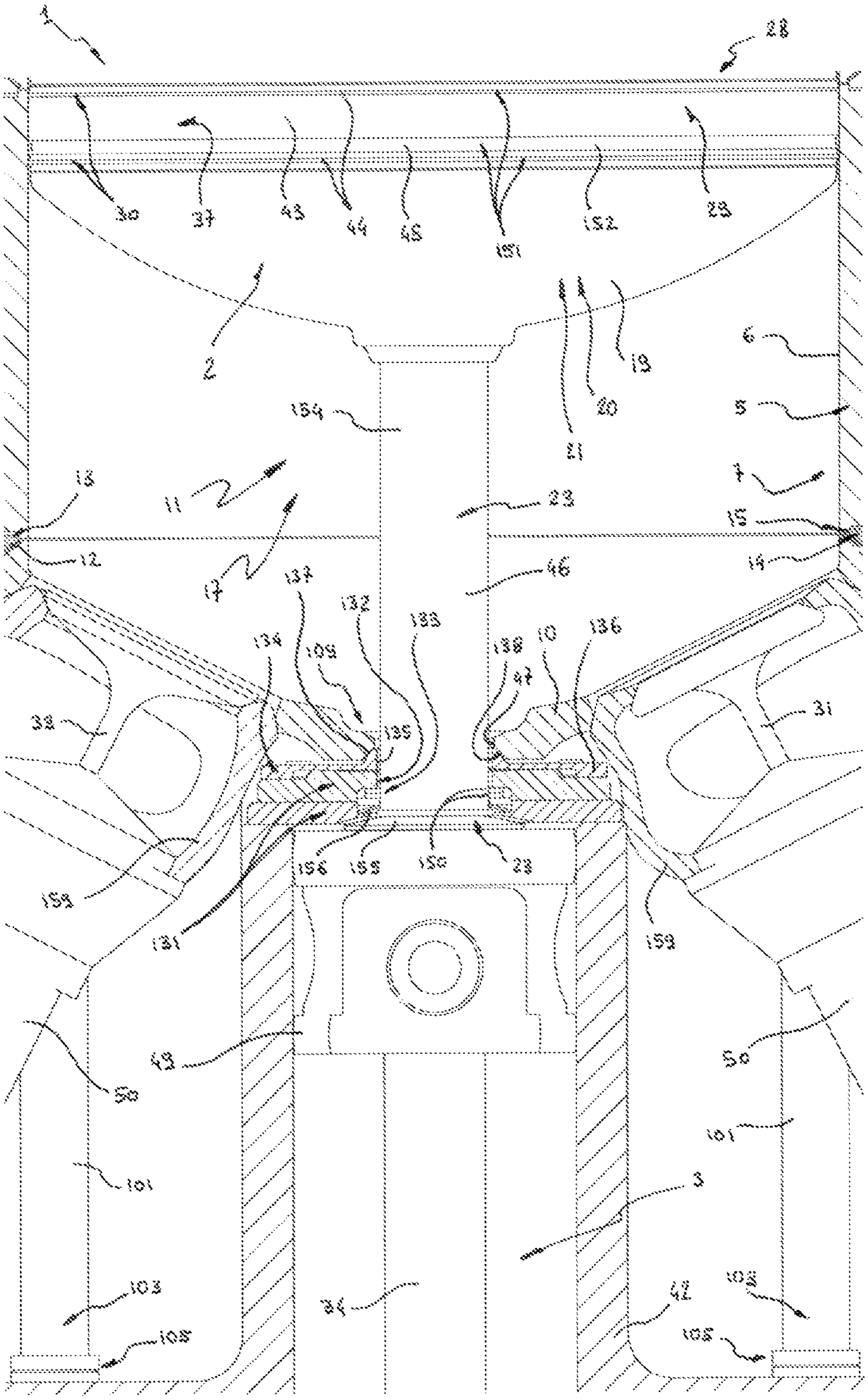

[Fig. 6]
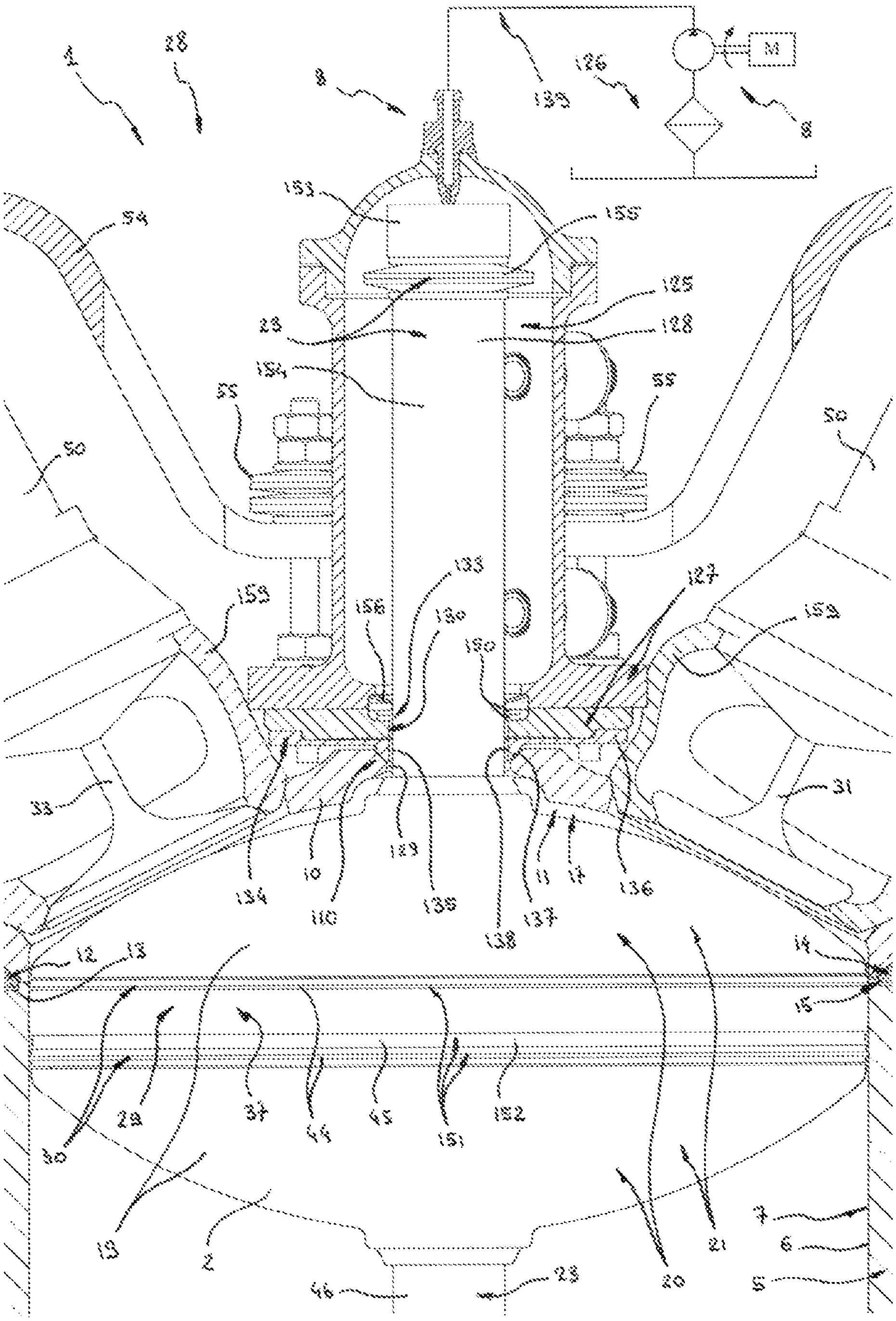

[Fig. 7]
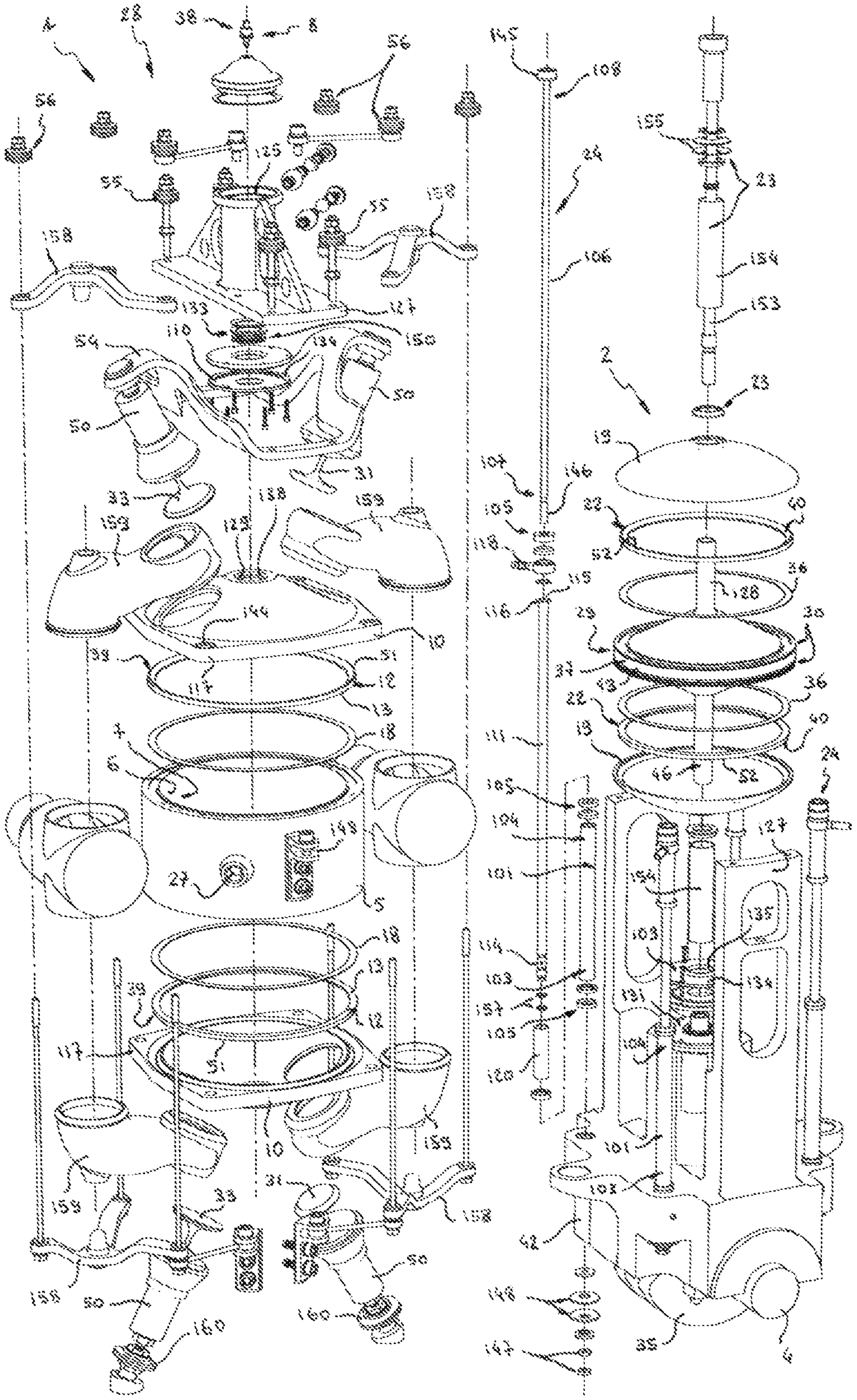

[Fig. 8]
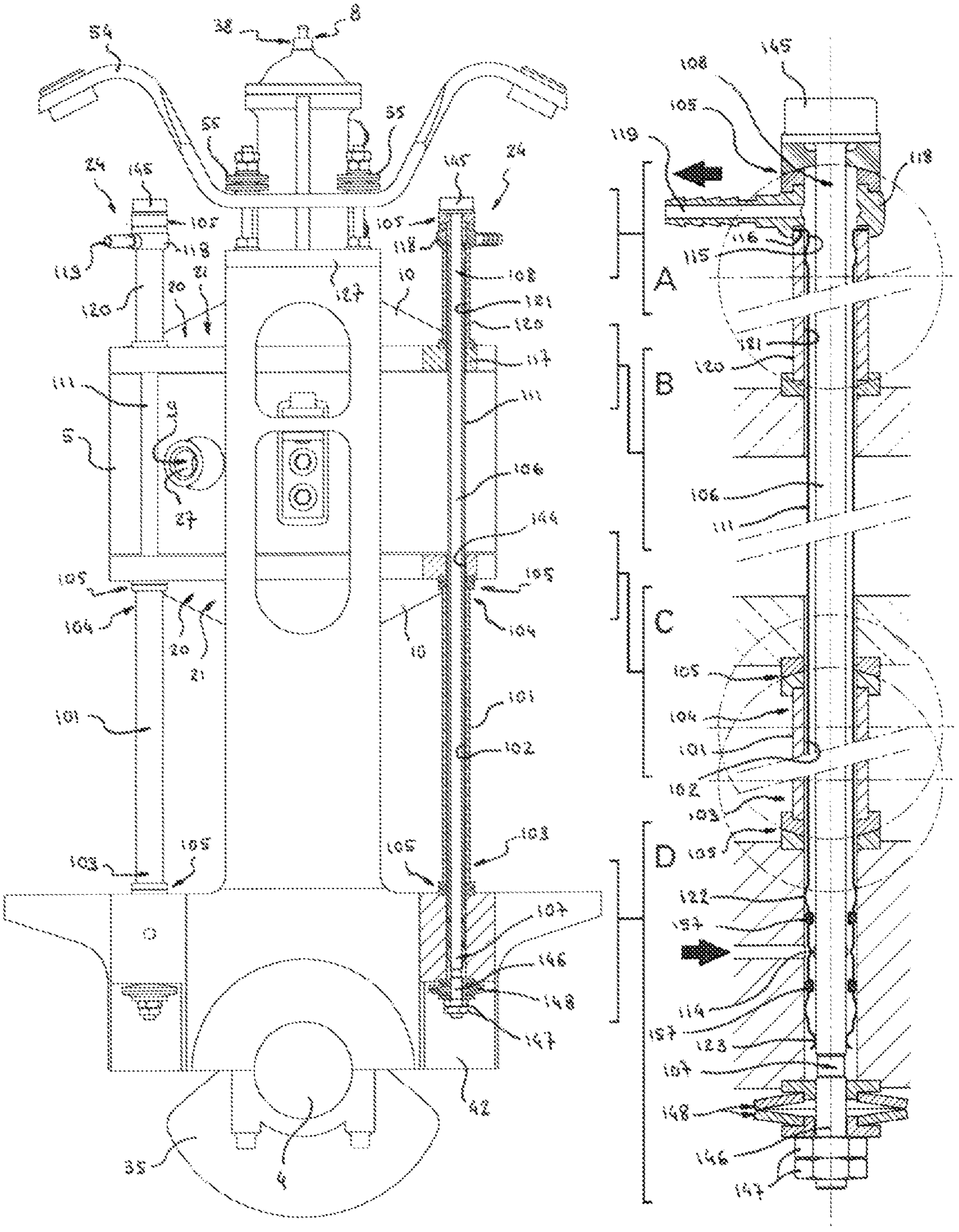

[Fig. 9]
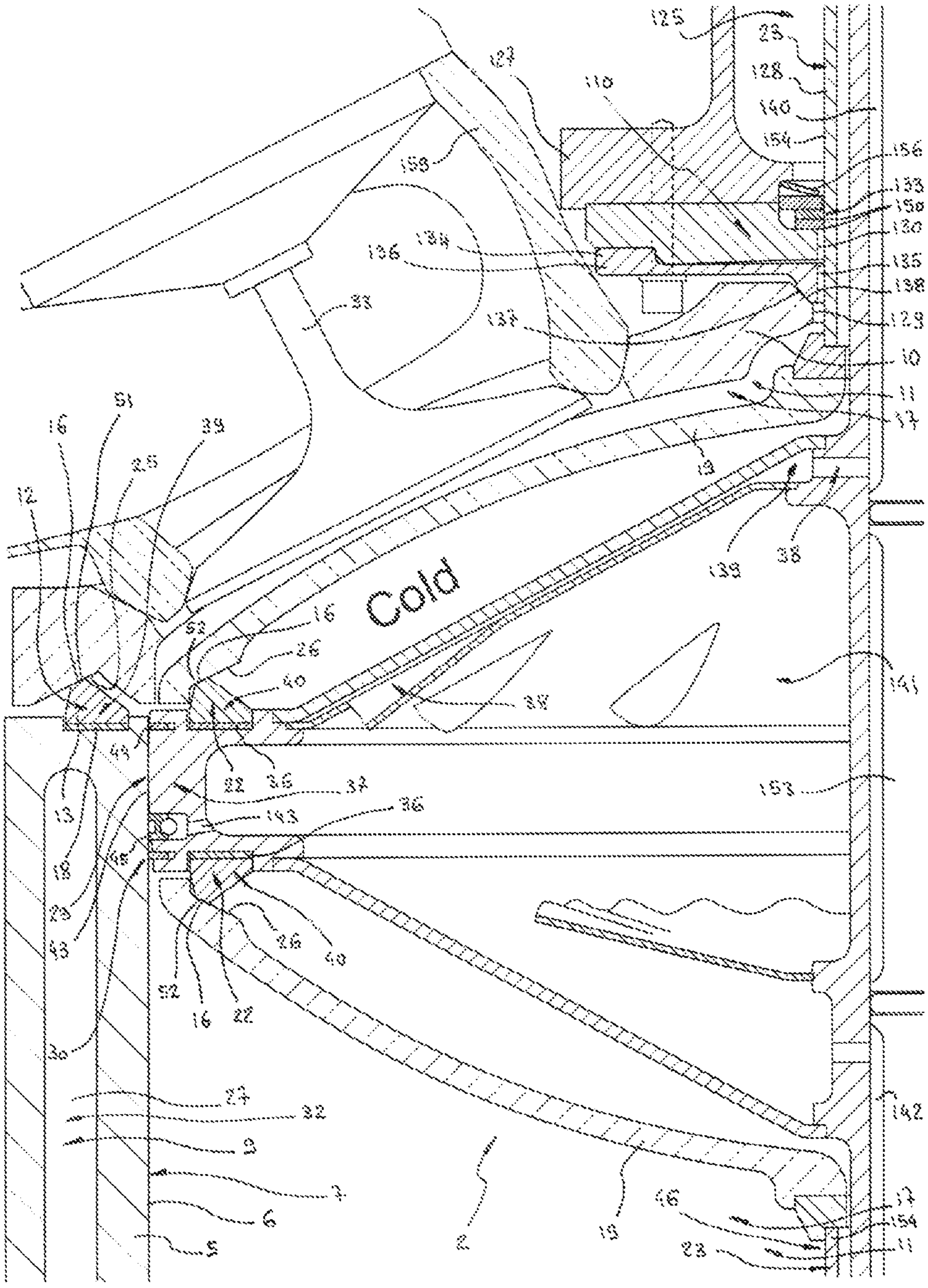

[Fig. 10]
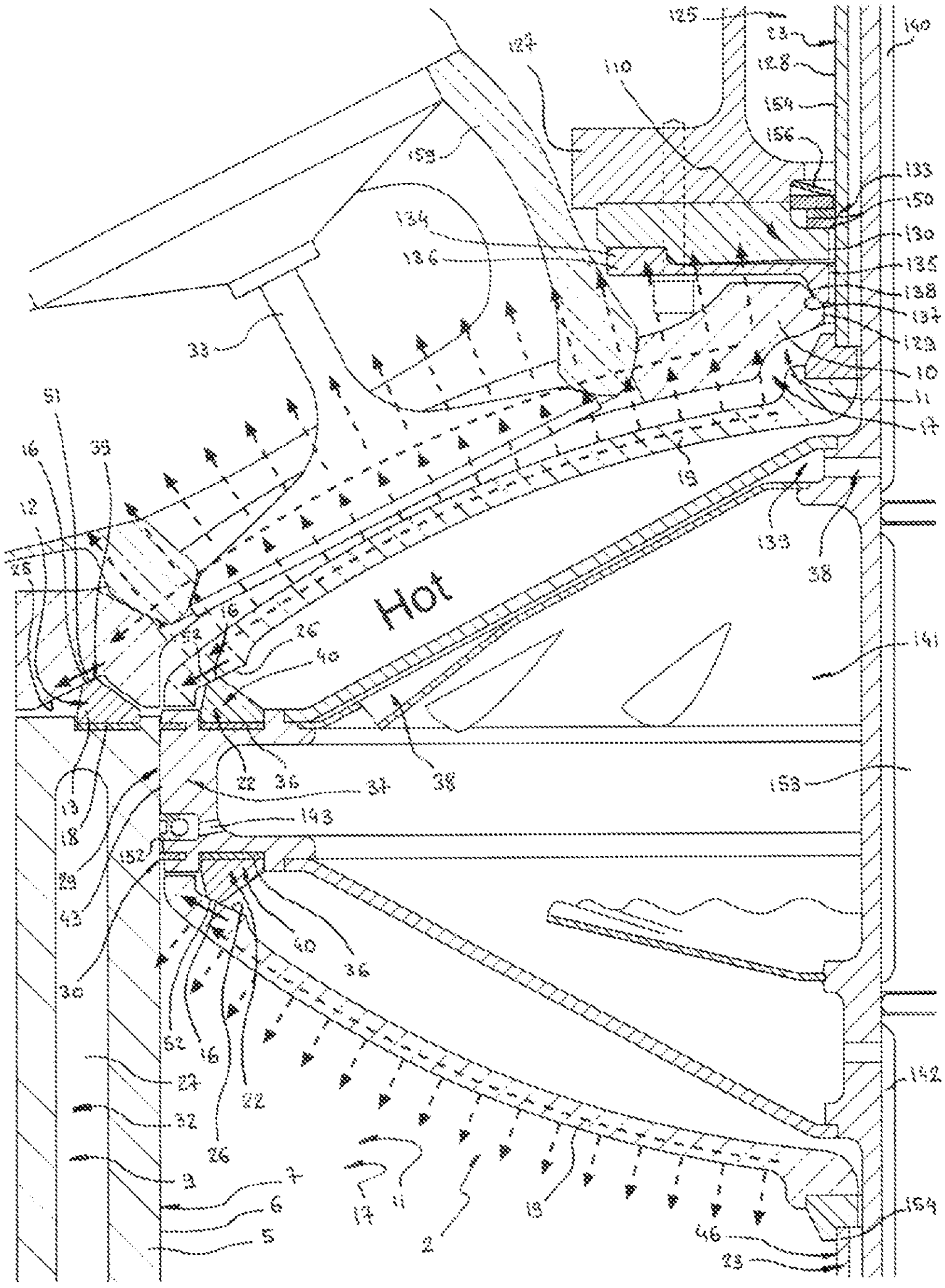

[Fig. 11]
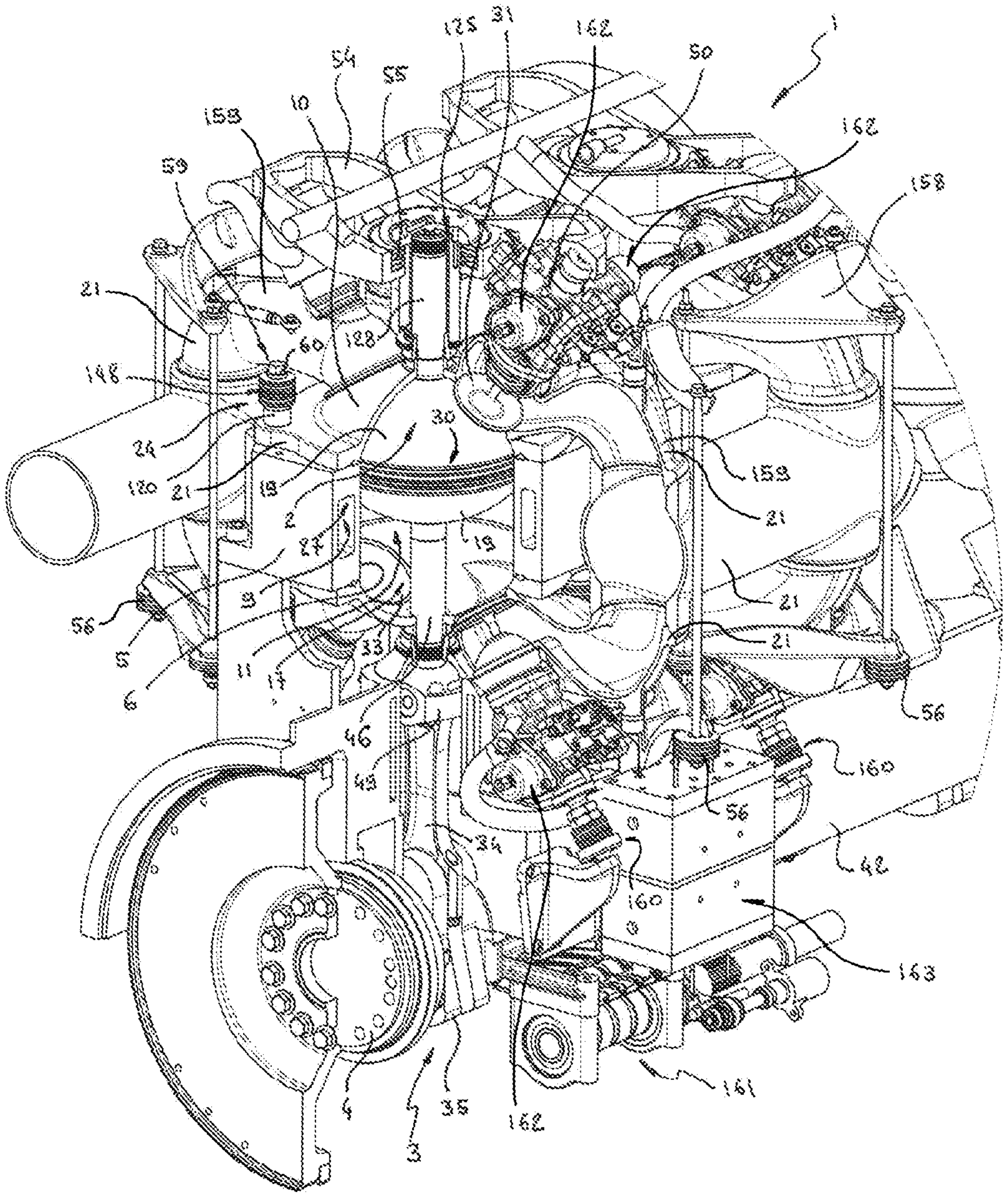

RECIPROCATING HEAT ENGINE WITH HOT CYLINDER HEAD AND COLD CYLINDER

BACKGROUND OF THE INVENTION

Field of the Invention

The present invention relates to a reciprocating heat engine with hot cylinder head and cold cylinder, said engine being particularly adapted for the implementation of the regenerative Brayton thermodynamic cycle which is usually carried out by means of centrifugal compressors and turbines.

Description of the Related Art

Regenerative Brayton cycle engines generally comprise separate members dedicated to each of the phases of said cycle, said phases taking place continuously and simultaneously in said members, unlike Rochas, Miller, Atkinson, or Diesel Beau cycle reciprocating internal combustion engines, the phases of which are performed successively into one and the same cylinder.

Consequently, regenerative Brayton cycle engines comprise at least one compressor, at least one regenerative exchanger, at least one burner operating continuously or an internal or external hot source, and at least one expansion valve, Allocate each phase of a thermodynamic cycle to a dedicated member has various advantages. In particular, the temperature of the inner walls of each said member can remain very close to that of the gases during said phase.

For example, the temperature of the inner walls of the compressor of a regenerative Brayton cycle engine can be maintained as low as possible, thereby helping to minimise compression work and maximise the total thermodynamic efficiency of said engine.

Conversely, since the internal walls of the expansion valve of said engine are in contact with the hot gases coming from the burner, their temperature must be high and in any case kept as close as possible to the mean temperature of said gases between the beginning and the end of their expansion.

Despite these advantages, the maximum thermodynamic efficiency of engines with centrifugal compressors and regenerative Brayton cycle turbines is in practice not much higher than that of conventional spark ignition engines, and at most comparable to that of fast diesel engines.

In all cases, said efficiency remains lower than that of two-stroke diesel engines which are slow by several tens of megawatts used, for example, for naval propulsion or stationary electricity production.

Furthermore, engines with centrifugal compressors and regenerative Brayton cycle turbines are not very suitable for low power, and can only operate over a restricted power range outside of which their efficiency drops drastically.

This is why engines with centrifugal compressors and regenerative Brayton cycle turbines are mainly used for applications where efficiency is not the only objective, and which require, for example, high specific and volume power, low acoustic and vibratory emissions, long service life, or reduced maintenance.

This is the case, for example, with certain military vessels fitted, for example, with the “Rolls-Royce WR 21” regenerative Brayton cycle engine with centrifugal compressor and turbines, the efficiency of which hardly exceeds forty percent, while that of the slow two-stroke diesel engines fitted to certain vessels exceeds fifty percent.

This is also the case for certain generators most often operating in cogeneration of electricity and heat, such as the micro-turbine “T100” from the company “Turbec”, or the micro-turbine “C65” from the company “Capstone”, the electrical efficiencies of which are of the order of twenty-eight to thirty percent only, but which require little maintenance while offering very long service lives.

The advantage of these turboshaft engines is that their turbines can withstand temperatures of about one thousand three hundred degrees Celsius. However, their total thermodynamic efficiency remains limited by that of the centrifugal compressors and the turbines that constitute them, the efficiency of said compressors and said turbines hardly exceeding eighty percent over a relatively narrow operating range.

In view of the above, it would be particularly advantageous to be able to replace the centrifugal compressors and turbines of regenerative Brayton cycle engines by positive-displacement piston machines, the efficiency of which is notoriously higher.

This is, for example, the subject of U.S. Pat. No. 4,653,269 of Mar. 31, 1987, where the expansion turbine usually found on regenerative Brayton cycle turboshaft engines is replaced by a piston volumetric expansion cylinder.

However, the calculations demonstrate that if the internal walls of said volumetric expansion valve are cooled and maintained, for example, around one hundred degrees Celsius, as is the case with reciprocating engines produced and marketed on a large scale, the thermodynamic efficiency of a regenerative Brayton cycle engine cannot exceed that of a motor vehicle diesel engine.

For a regenerated Brayton cycle engine with a volumetric expansion valve to deliver very high thermodynamic efficiencies, it is essential that the internal walls of its expansion valve be maintained at a temperature close to the average temperature of the gases expanded in said expansion valve.

For example, if the hot gases are introduced into the expansion valve at a temperature of one thousand three hundred degrees Celsius and are expelled from said expansion valve at the end of the expansion at a temperature of six hundred degrees Celsius, the internal walls of said expansion valve must be maintained at a temperature of approximately nine hundred and fifty degrees Celsius.

The problem is that at such a temperature, it is impossible to maintain an oil film on the walls of the cylinder of the expansion valve in order to lubricate any sealing segments that an expansion valve piston moving in said cylinder would comprise.

Indeed, from about one hundred and sixty degrees Celsius, the oil film on the cylinder begins to coke, and then burns beyond two hundred and fifty degrees Celsius.

The production of a regenerative Brayton cycle engine with high thermodynamic efficiency therefore faces a double impasse.

Indeed, either said engine consists of centrifugal compressors and turbines resistant to high temperature, but in this case, the modest efficiency of these members does not allow it to exceed a total efficiency equivalent to that of an automotive diesel engine, or it consists of a piston volumetric expansion valve which, in order to be sealed, requires a piston provided with sealing segments sliding on an oil film formed on the surface of a cylinder, the latter needing, to this end, to remain at a temperature not exceeding about one hundred and twenty degrees Celsius, which also does not allow the total efficiency of said engine to be competitive.

In this context, it would be advantageous to be able to combine the ability of turbines to operate at high temperature with that of piston volumetric machines to expand gases at a high efficiency.

It is for this purpose that the thermal engine with transfer-expansion and regeneration according to patent no. WO2016120560 published on Aug. 4, 2016 and belonging to the applicant comprises contactless piston sealing means consisting of an inflatable perforated continuous ring which, when it is subjected to a certain internal pressure, inflates and approaches a few micrometers from the expansion valve cylinder with which it cooperates without touching said cylinder, while allowing compressed air to leak via calibrated orifices which pass right through it in its radial thickness.

The above-described fluid cushion sealing device is also the subject matter of patent No. FR 3032252 issued on May 25, 2018 and belonging to the applicant. This device makes it possible to provide a contactless sealing and thus to no longer use oil to lubricate a segment operating by contact, and thus to engage with a hot expansion valve cylinder maintained at a temperature of several hundreds of degrees Celsius.

In this context, it therefore effectively becomes possible to use a piston volumetric expansion valve to produce a regenerative Brayton cycle engine, and to maximize the efficiency of said engine in order to greatly exceed that of diesel cycle engines.

Specifically, calculations and simulations demonstrate that the thermodynamic efficiency of a piston volumetric regeneration Brayton cycle engine can reach or even exceed seventy percent, which in practice can lead to the production of engines whose brake energy efficiency exceeds sixty percent once the inevitable thermal and mechanical irreversibilities due to the very constitution of said engines have been deducted.

The problem encountered with the fluid cushion sealing device of patent No. FR 3032252 is that the temperature of the cylinder still remains excessive for the available materials of which the perforated continuous ring can be made.

In fact, in order for the efficiency of a piston volumetric regeneration Brayton cycle engine to be significantly higher than that of existing diesel engines, the gases must be introduced into its expansion valve at a temperature of the order of one thousand three hundred degrees Celsius, under a pressure of approximately twenty bars.

It results from these operational conditions that the temperature of the internal walls of the expansion valve stabilizes around nine hundred and fifty degrees Celsius.

Given that the continuous perforated ring according to patent No. FR 3032252 is close to the cylinder with which it cooperates by only a few microns, in practice, said ring takes the temperature of about nine hundred and fifty degrees Celsius of said cylinder.

Yet, no material can make it possible both to manufacture said ring and to withstand such a temperature.

Even a superalloy such as "Udimet 720" in particular used in aeronautics and in the space industry and known for its resistance to extreme temperatures cannot withstand such a temperature without being subject to creep and while being subjected to the inflation stress imposed by the continuous perforated ring of the fluid cushion sealing device according to patent No. FR 3032252.

It is for this reason in particular, and in order to make use of materials which are more common than high-temperature-resistant ceramics, that the regenerative cooling system of patent No. EP 3585993 published on Apr. 7, 2021 and belonging to the applicant provides for the temperature of the inner walls of the expansion valve, and in particular of the cylinder, to be lowered to practical values of about seven hundred degrees Celsius.

For example, the superalloy "Udimet 720" withstands creep at a temperature of seven hundred degrees Celsius if it is subjected to a stress not exceeding two hundred and thirty mega Pascals.

The regenerative cooling system according to patent No. EP 3585993 provides a cooling enclosure which surrounds the expansion valve while leaving a gas circulation space between said enclosure and said expansion valve in which the gases leaving the expansion valve itself circulate at a temperature in the range from five hundred degrees Celsius to six hundred degrees Celsius.

Thus, according to the regenerative cooling system according to patent No. EP 3585993, the exhaust gases of the expansion valve maintain the temperature of the inner walls of the expansion valve at a temperature of around seven hundred degrees Celsius, while the heat exported by said gases is essentially recovered in order to be reintroduced into the cycle by the regenerative heat exchanger comprised in the piston regenerative Brayton cycle reciprocating engine.

In this context, the fluid cushion sealing device of patent No. FR 3032252 can be used with a continuous perforated ring, for example made of "Udimet 720" superalloy.

However, in return for this possibility, the cylinder and the cylinder heads of the piston regenerative Brayton cycle reciprocating engine must be made of materials with a high nickel content, such as "Niresist" cast iron, which, owing to the high volatility and the high price of nickel, represents an economic disadvantage.

In all cases, it will be noted that the temperature of the expansion valve remains at least six hundred degrees Celsius higher than that of the rest of the engine and in particular of the movable coupling and of the transmission casing in which said coupling is housed.

Advantageously, the differential expansions which result from this temperature difference can in particular be managed by the double-acting expansion cylinder with adaptive support which is the subject of patent No. EP3350433 issued on Aug. 7, 2019 and belonging to the applicant.

Said support allows an isotropic or anisotropic expansion of the expansion cylinder which is very different from that of the transmission casing to which it is fixed, without compromising either the operation of said cylinder or that of the piston which moves in said cylinder.

Said support also maintains the piston centred in the cylinder, transmits the axial forces resulting from the expansion of the gases to the transmission casing, and limits heat transfers from the expansion valve cylinder to said casing Upon reading the above, it will be understood that no configuration is fully satisfactory at this stage that makes it possible to produce a piston regenerative Brayton cycle reciprocating engine under the best possible conditions.

Specifically, the fluid cushion sealing device must be fed with compressed air by a compressor which consumes some of the work available on the shaft of the piston regenerative Brayton cycle reciprocating engine, to the detriment of the total efficiency of the latter.

This reduces the final energy efficiency of said engine, all the more so if the latter operates at low power because the amount of compressed air to be fed to the fluid cushion sealing device is almost constant, regardless of the speed and load of said engine.

Furthermore, in order to guarantee lasting operation of the fluid cushion sealing device, recourse must be had to the regenerative cooling system according to patent No. EP 3585993, and said system is not energy neutral.

Specifically, said cooling system makes the path of the gases expelled from the expansion valve tortuous and induces pressure drops which reduce the total efficiency of the piston regenerative Brayton cycle reciprocating engine.

Furthermore, the heat extracted from the inner walls of the expansion valve by the regenerative cooling system is reintroduced into the Brayton cycle upstream of a burner or a hot source by a regenerative heat exchanger the efficiency of which is not one hundred percent.

A portion of the heat extracted from the inner walls of the expansion valve is therefore lost, and the power passing through the exchanger increases due to the presence of said cooling system.

In addition, the specific power of the piston regenerative Brayton cycle reciprocating engine is substantially reduced by the regenerative cooling system according to patent No. EP 3585993, which implies upward revision of the sizing of said engine in order to meet the power objectives of the application for which it is intended.

It is also noted that the development of the fluid cushion sealing device of patent No. FR 3032252 remains complex, particularly in order to ensure its correct operation in the context of non-stationary applications subjected to shocks and vibrations.

SUMMARY OF THE INVENTION

That is why, without excluding any other application in any field whatsoever, the hot cylinder head and cold cylinder reciprocating heat engine according to the invention is provided, inter alia, for making piston regenerative Brayton cycle reciprocating engines in which the mainly hot expansion valve limits heat losses, while at the same time ensuring robust and durable sealing between the piston and the cylinder of said expansion valve.

In the field of application of piston reciprocating heat machines in general and of heat engines in particular, the result of the invention is a reciprocating heat engine with hot cylinder head and cold cylinder:

- the cylinder head and the piston crowns of which are maintained at a high temperature so as to limit the cooling of the hot gases in contact therewith;
- the sealing of which between the piston and the cylinder can be achieved by means of segments made of cast iron or steel such as those comprised in conventional spark-ignition or diesel cycle internal combustion engines;
- which no longer uses the fluid cushion sealing device which is the subject of patent No. FR 3032252 and therefore, which no longer requires a regenerative cooling system such as that described in patent No. EP 3585993, and therefore no longer undergoes either the power and efficiency losses associated with the use of a compressor for supplying said sealing device, or the additional pressure losses at the outlet of the expansion valve associated with a more tortuous path of the gases, or the heat losses due to the efficiency of the regenerative heat exchanger of less than "one", or the specific power losses of the engine associated with this configuration.

Furthermore, as an alternative to materials with a high nickel content, such as "Niresist" cast iron, the hot cylinder head of the reciprocating heat engine with hot cylinder head and cold cylinder according to the invention can be made of silicon carbide, a material with a high mechanical strength at high temperatures, which is abundant and inexpensive, while the cylinder of said engine can be made of cast iron at a low cost price such as that usually used for making the cylinder casings of automotive diesel engines.

In addition, the lower density of the silicon carbide and the absence of a regenerative cooling system lead to a lower weight of the reciprocating heat engine with hot cylinder head and cold cylinder according to the invention and to a lower total heat capacity of said engine, which promotes a rapid rise in temperature of said engine by reducing the energy required to reach its operating temperature, and which leads to a lower energy consumption of said engine, particularly when the latter is applied to road, rail or maritime transport.

It is understood that the reciprocating heat engine with hot cylinder head and cold cylinder according to the invention can be applied, further to heat engines which are generally stationary or mobile and which have internal or external combustion, to any other application which is similar in concept and in principle and which could advantageously take advantage of the particular features and functionalities of said engine according to the invention.

The other features of the present invention have been described in the description and in the secondary claims depending directly or indirectly on the main claim.

The reciprocating heat engine with hot cylinder head and cold cylinder comprising a cooled cylinder casing in which is arranged at least one cold cylinder in which a piston oriented and/or located by piston guide means can move in translation, said piston being directly or indirectly connected by power transmission means housed in a transmission casing to at least one rotary or reciprocating power output shaft, comprises

- lubricating means which form a lubricant film which is interposed between the cold cylinder and the piston;
- cylinder casing cooling means which cool the cooled cylinder casing so as to maintain all or part of the internal surface of the cold cylinder at a sufficiently low temperature such that the lubricant film does not age prematurely, coke, or burn;
- at least one hot cylinder head, the operating temperature of which is significantly higher than that of the cooled cylinder casing which it covers so as to form, with the piston, a hot variable-volume chamber which contains a working gas, said cylinder head being, on the one hand, held applied against the cooled cylinder casing by cylinder head applying means that leave it free to expand relative to said cylinder casing, and, on the other hand, located relative to said cylinder casing by cylinder head centering means;
- at least one piston sealing ring provided at the periphery of the piston, said ring comprising, on the one hand, piston sealing means that form a sealing between the piston and the cold cylinder and, on the other hand, being cooled by sealing ring cooling means;
- at least one hot crown which is interposed between the hot variable-volume chamber and the piston and the operating temperature of which is significantly higher than that of the cooled cylinder casing, said crown being, on the one hand, held applied against the piston by crown applying means which leave said crown free to expand relative to said piston, and, on the other hand, located relative to said piston by crown centering means.

The reciprocating heat engine with hot cylinder head and cold cylinder according to the invention comprises sealed thermal insulation means which are interposed between the cooled cylinder casing and the hot cylinder head.

The reciprocating heat engine with hot cylinder head and cold cylinder according to the invention comprises thermal insulation means which are interposed between the hot crown and the piston.

The reciprocating heat engine with hot cylinder head and cold cylinder according to the invention comprises thermal insulation means which consist of a reflective screen.

The reciprocating heat engine with hot cylinder head and cold cylinder according to the invention comprises thermal insulation means which consist of a honeycomb or fibrous insulating material which occupies all or part of the space between the hot crown and the piston.

The reciprocating heat engine with hot cylinder head and cold cylinder according to the invention comprises sealed thermal insulation means and/or thermal insulation means which consist of at least one insulating ring made of a material of low thermal conductivity.

The reciprocating heat engine with hot cylinder head and cold cylinder of the invention comprises a material of low thermal conductivity that mainly consists of zirconium oxide.

The reciprocating heat engine with hot cylinder head and cold cylinder according to the invention comprises an insulating ring which forms the sealed thermal insulation means which is directly or indirectly in contact with the cooled cylinder casing and/or with the hot cylinder head via at least one contact edge of small surface area which prevents the working gas from passing between the cooled cylinder casing and the hot cylinder head.

The reciprocating heat engine with hot cylinder head and cold cylinder according to the invention comprises an insulating ring which forms the thermal insulation means which is directly or indirectly in contact with the hot crown and/or with the piston by means of at least one contact edge of small surface area.

The reciprocating heat engine with hot cylinder head and cold cylinder according to the invention comprises a cylinder head seal which is interposed between the insulating ring which forms the sealed thermal insulation means and the cooled cylinder casing and/or between said ring and the hot cylinder head.

The reciprocating heat engine with hot cylinder head and cold cylinder according to the invention comprises a piston seal which is interposed between the insulating ring which forms the thermal insulation means and the hot crown and/or between said ring and the piston.

The reciprocating heat engine with hot cylinder head and cold cylinder according to the invention comprises a hot cylinder head and/or a hot crown which are entirely or partially made of a material resistant to high temperatures.

The reciprocating heat engine with hot cylinder head and cold cylinder according to the invention comprises a material which is resistant to high temperatures and which mainly consists of silicon carbide.

The reciprocating heat engine with hot cylinder head and cold cylinder according to the invention comprises a hot cylinder head which has a concave conical cylinder head surface by means of which said cylinder head is held applied by the cylinder head applying means against a circular cylinder contact edge provided on the cooled cylinder casing, the angle of the concave cone formed by said surface being such that when said surface slides on said edge due to the difference between the thermal expansion of said cylinder head and that of said cylinder casing, the axial distance which separates the bearing point of the cylinder head applying means against the hot cylinder head of the cooled cylinder casing remains approximately constant, all else being equal, while the concave conical cylinder head surface and the circular cylinder contact edge form the cylinder head centering means.

The reciprocating heat engine with hot cylinder head and cold cylinder according to the invention comprises a hot crown which has a concave conical crown surface by means of which said crown is held applied by the crown applying means against a piston circular contact edge provided on the piston, the angle of the concave cone formed by said surface being such that, when said surface slides on said edge due to the difference between the thermal expansion of said crown and that of the piston, the axial distance which separates the bearing point of the crown applying means on said hot crown of the piston remains approximately constant, all else being equal, while the concave conical crown surface and the piston circular contact edge form the crown centering means.

The reciprocating heat engine with hot cylinder head and cold cylinder according to the invention comprises a hot crown which has, at its periphery, an aerodynamic passivation bead.

The reciprocating heat engine with hot cylinder head and cold cylinder according to the invention comprises an outside of the hot cylinder head which is covered with a thermal insulation.

The reciprocating heat engine with hot cylinder head and cold cylinder according to the invention comprises a piston sealing ring which has piston guide means consisting of an annular sliding surface.

The reciprocating heat engine with hot cylinder head and cold cylinder according to the invention comprises a cooled cylinder casing which is held clamped between a lower hot cylinder head and an upper hot cylinder head by the cylinder head applying means, while the piston is double-acting and comprises, on the one hand, a lower piston rod which connects it to the power transmission means and which passes right through the lower hot cylinder head via a lower rod orifice, and, on the other hand, a lower hot crown and an upper hot crown in order to define, with the lower and upper hot cylinder heads, a lower variable-volume hot chamber and an upper variable-volume hot chamber.

The reciprocating heat engine with hot cylinder head and cold cylinder according to the invention comprises:

- at least one recessed pillar which is passed right through in the lengthwise direction by a rod tunnel, a first pillar end of said pillar resting directly or indirectly on the transmission casing while a second pillar end of said pillar supports the lower hot cylinder head, said first end being able to pivot about a ball joint and/or bend relative to said casing while said second end is able to pivot about a ball joint and/or bend relative to said lower hot cylinder head;
- at least one traction rod which forms the cylinder head applying means and which is, at least in part, housed in the rod tunnel, a first rod end of said traction rod being directly or indirectly secured to the transmission casing while a second rod end of said rod is directly or indirectly secured to the upper hot cylinder head, said first end being able to pivot about a ball joint and/or bend relative to said casing while said second end is able to pivot about a ball joint and/or bend relative to said cylinder head;
- lower cylinder head centering means which are secured to the transmission casing and which bear directly or indirectly on the lower hot cylinder head, said means leaving said cylinder head free to move a short distance parallel to the longitudinal axis of the cold cylinder and relative to the transmission casing, but preventing said cylinder head from moving in the plane perpendicular to said axis relative to said casing;

upper cylinder head centering means which are secured to a centering gantry which is rigidly fixed to the transmission casing, said means bearing directly or indirectly on the upper hot cylinder head, and said means leaving said cylinder head free to move over a short distance parallel to the longitudinal axis of the cold cylinder and relative to the transmission casing, but preventing said cylinder head from moving in the plane perpendicular to said axis relative to said casing.

The reciprocating heat engine with hot cylinder head and cold cylinder according to the invention comprises a rod cooling tube which sealingly envelops the traction rod over all or a portion of the length of said rod, a heat transfer liquid coming from a source of cooling liquid being able to circulate in a space left between the inner wall of said tube and the outer surface of said rod, while the largest possible portion of the outer surface of said tube does not touch the inner wall of the rod tunnel so as to define with the latter wall an empty space.

The reciprocating heat engine with hot cylinder head and cold cylinder according to the invention comprises at least one first tube supply orifice that communicates with the inside of the rod cooling tube in the vicinity of the first rod end, and at least one second tube supply orifice that communicates with the inside of the rod cooling tube in the vicinity of the second rod end, the heat transfer liquid being able to circulate between said two orifices.

The reciprocating heat engine with hot cylinder head and cold cylinder according to the invention comprises a rod cooling tube which comprises a tube collar held directly or indirectly clamped by the traction rod either against a fixing lug that the upper hot cylinder head has, or against the transmission casing.

The reciprocating heat engine with hot cylinder head and cold cylinder according to the invention comprises a tube collar which is held clamped by the traction rod against the fixing lug by means of a Banjo coupling which comprises at least one radial coupling duct which is connected to the source of cooling liquid on the one hand, and which communicates with the inside of the rod cooling tube on the other hand.

The reciprocating heat engine with hot cylinder head and cold cylinder according to the invention comprises a thermal insulation riser which is interposed between the tube collar and the fixing lug, said riser being passed right through in the lengthwise direction by a riser tunnel in which the traction rod and the rod cooling tube which sealingly envelops it are housed, while the largest possible part of the outer surface of said tube does not touch the inner wall of the riser tunnel so as to define with this latter wall an empty space.

The reciprocating heat engine with hot cylinder head and cold cylinder according to the invention comprises a rod cooling tube which comprises at least one tube bulge consisting of an axial portion of said tube, the free diameter of which is substantially equivalent to or even slightly greater than that of the rod tunnel in which it is housed.

The reciprocating heat engine with hot cylinder head and cold cylinder of the invention comprises a rod cooling tube which comprises at least one tube diameter restriction consisting of an axial portion of said tube the free diameter of which is substantially equivalent to or even slightly smaller than the diameter of the body of the traction rod.

The reciprocating heat engine with hot cylinder head and cold cylinder according to the invention comprises a traction rod which is hollow in order to form an internal rod cooling channel provided in the length of said rod, said channel opening out axially or radially in the vicinity of each end of said rod while a heat transfer liquid originating from a source of cooling liquid can circulate in said channel.

The reciprocating heat engine with hot cylinder head and cold cylinder according to the invention comprises a piston cooling and lubricating chamber which is connected to a lubricating-cooling fluid source and which is fixed to the centering gantry or arranged on or in the latter, while an upper piston rod which extends the double-acting piston on the side of the upper variable-volume hot chamber passes through the upper hot cylinder head via an upper rod orifice provided in said cylinder head and via an access orifice to the cooling and lubricating chamber passing through the centering gantry to open out into the piston cooling and lubricating chamber such that the end of the upper piston rod which is furthest from said piston always remains immersed in said chamber whatever the position of said piston.

The reciprocating heat engine with hot cylinder head and cold cylinder according to the invention comprises a lubricating-cooling fluid which can circulate from the piston cooling and lubricating chamber to the transmission casing by passing successively via an upper piston rod internal channel provided longitudinally in the upper piston rod, via an internal piston cavity, and via a lower piston rod internal channel provided longitudinally in the lower piston rod.

The reciprocating heat engine with hot cylinder head and cold cylinder according to the invention comprises a periphery of the internal piston cavity which communicates with the external peripheral face of the piston sealing ring via at least one peripheral ring lubrication orifice which opens out axially between at least two piston sealing means, said orifice consisting of the lubricating means.

The reciprocating heat engine with hot cylinder head and cold cylinder according to the invention comprises a transmission casing which is covered with a centering and sealing plate pierced with an orifice for access to the transmission means through which the lower piston rod passes in order to be connected to the power transmission means, said plate being rigidly fixed to said casing.

The reciprocating heat engine with hot cylinder head and cold cylinder according to the invention comprises an orifice for access to the cooling and lubricating chamber which comprises rod sealing means providing a sealing between said orifice and the upper piston rod.

The reciprocating heat engine with hot cylinder head and cold cylinder according to the invention comprises an orifice for access to the transmission means which comprises rod sealing means providing a sealing between said orifice and the lower piston rod.

The reciprocating heat engine with hot cylinder head and cold cylinder according to the invention comprises means for centering the lower cylinder head and/or means for centering the upper cylinder head which consist of an resilient centering disk which can be pierced at its center with a disk hole through which the lower piston rod or an upper piston rod respectively passes while its periphery consists of a disk fixing collar sealingly fixed respectively to the transmission casing and/or to the centering gantry.

The reciprocating heat engine with hot cylinder head and cold cylinder according to the invention comprises a centering and sealing plate which carries the lower cylinder head centering means which consist of an resilient centering disk the periphery of which forms a disk fixing collar sealingly fixed on said plate, said disk being pierced at its center with a disk hole through which the lower piston rod passes without touching said disk, the edge of the disk hole having a circular contact pad which is maintained in sealed contact with a centering and sealing cone which the lower hot cylinder head has, said cone possibly being male or female, and the contact between said pad and said cone having the effect of deforming the resilient centering disk axially and from its center.

The reciprocating heat engine with hot cylinder head and cold cylinder according to the invention comprises means for centering the upper cylinder head which consist of an resilient centering disk, the periphery of which forms a disk fixing collar sealingly fixed to the centering gantry, said disk being pierced at its center with a disk hole, the edge of which has a circular contact pad which is maintained in sealed contact with a centering and sealing cone which the upper hot cylinder head has, said cone possibly being male or female, and the contact between said pad and said cone having the effect of deforming the resilient centering disk axially and from its center.

The reciprocating heat engine with hot cylinder head and cold cylinder according to the invention comprises an anti-rotation connection which directly or indirectly connects the lower hot-cylinder head and/or the upper hot-cylinder head and/or the cooled cylinder casing to the centering gantry.

The reciprocating heat engine with hot cylinder head and cold cylinder according to the invention comprises cylinder head applying means which consist of at least one cylinder head applying screw which is cooled by the cylinder casing cooling means.

The reciprocating heat engine with hot cylinder head and cold cylinder according to the invention comprises a thermal insulation riser which is interposed between a screw head which the cylinder head applying screw has and the hot cylinder head.

The reciprocating heat engine with hot cylinder head and cold cylinder according to the invention comprises at least one compression spring which is interposed between the screw head and the thermal insulation riser.

BRIEF DESCRIPTION OF THE DRAWINGS

The following description given by way of non-limiting examples and with reference to the accompanying drawings, makes it possible to understand the invention better, and to understand the features that it has, and the advantages that it can provide:

FIG. 1 is a schematic cross-sectional view of the reciprocating heat engine with hot cylinder head and cold cylinder according to the invention, valves which supply the hot variable-volume chamber of said engine not appearing on said cross-section.

FIG. 2 is a three-dimensional view of a reciprocating heat engine with hot cylinder head and cold cylinder according to the invention, the piston of which is double-acting, said engine forming an expansion valve which makes it possible, for example, to implement a regenerative Brayton thermodynamic cycle.

FIG. 3 is a three-dimensional cross-sectional view of the reciprocating heat engine with hot cylinder head and cold cylinder according to the invention, and according to the particular configuration of said engine shown in FIG. 2, the double-acting piston defining, with a lower hot cylinder head and an upper hot cylinder head, a lower variable-volume hot chamber and an upper variable-volume hot chamber.

FIG. 4 is a cross-sectional view of the reciprocating heat engine with hot cylinder head and cold cylinder according to the invention, and according to the particular configuration of said engine shown in FIGS. 2 and 3.

FIG. 5 is a close-up cross-sectional view of the reciprocating heat engine with hot cylinder head and cold cylinder according to the invention and according to the particular configuration of said engine shown in FIGS. 2 to 4, said view highlighting in particular how the double-acting piston is connected to the power transmission means, and how the sealing between the lower piston rod and the transmission casing is achieved.

FIG. 6 is a close-up cross-sectional view of the reciprocating heat engine with hot cylinder head and cold cylinder according to the invention and according to the particular configuration of said engine shown in FIGS. 2 to 5, said view highlighting in particular how the upper piston rod of the double-acting piston opens out into the piston cooling and lubricating chamber, and how the sealing between said rod and a centering gantry is achieved.

FIG. 7 is an exploded three-dimensional view of the reciprocating heat engine with hot cylinder head and cold cylinder according to the invention and according to the particular configuration of said engine shown in FIG. 2.

FIG. 8 is a view, partly three-dimensional and partly in schematic cross-section, of a part of the reciprocating heat engine with hot cylinder head and cold cylinder according to the invention and according to the particular configuration of said engine shown in FIGS. 2 to 7, said view highlighting the main sections that make up the recessed pillars and the traction rods that form the means for applying the cylinder head of the hot cylinder heads against the cooled cylinder casing.

FIG. 9 is a close-up schematic cross-sectional view of the reciprocating heat engine with hot cylinder head and cold cylinder according to the invention and according to the particular configuration of said engine as shown in FIGS. 2 to 8, said view showing the position and dimensions of the hot crowns relative to the double-acting piston and of the upper hot cylinder head relative to the cooled cylinder casing when said crowns and said cylinder head are cold.

FIG. 10 is a schematic cross-sectional view similar to that shown in FIG. 9, said view showing the position and dimensions of the hot crowns of the double-acting piston and of the upper hot cylinder head relative to the cooled cylinder casing when said crowns and said cylinder head are hot and expand under the effect of temperature.

FIG. 11 is a three-dimensional cutaway view of the reciprocating heat engine with hot cylinder head and cold cylinder according to the invention, the piston of which is double-acting, said engine forming an expansion valve for, for example, implementing a regenerative Brayton thermodynamic cycle, the cooled cylinder casing being directly secured to the transmission casing while said engine receives a regenerative hydraulic valve actuator and its hydraulic closing and regeneration motor according to U.S. Pat. No. 3,071,896 of Oct. 11, 2019 belonging to the applicant.

DESCRIPTION OF THE INVENTION

FIGS. 1 to 10 show the reciprocating heat engine with hot cylinder head and cold cylinder 1 according to the invention, various details of its components, its variants, and its accessories.

The reciprocating heat engine with hot cylinder head and cold cylinder 1 comprises a cooled cylinder casing 5 in which is provided at least one cold cylinder 6 in which a piston 2 oriented and/or located by piston guide means 29 can move in translation.

The piston 2 is directly or indirectly connected by power transmission means 3 housed in a transmission casing 42 to at least one rotary or reciprocating power output shaft 4.

The power transmission means 3 can for example take the form of a connecting rod 34 hinged about a crank 48 arranged on a crankshaft 35, said connecting rod 34 being able to be connected to the piston 2 directly by a piston pin or indirectly by means of a crosshead 49.

Said means 3 can also consist of a cam, a transmitting hydraulic pump, a linear or rotary electricity generator or any other transmission means known to a person skilled in the art.

As can be seen in FIGS. 1 to 10, the reciprocating heat engine with hot cylinder head and cold cylinder 1 according to the invention comprises lubricating means 8 that form a lubricant film 7 which is interposed between the cold cylinder 6 and the piston 2, said means 8 possibly being made, for example, by sparging the power transmission means 3 in liquid lubricant contained in the transmission casing 42.

FIGS. 1, 3, 4, 9 and 10 clearly show that the reciprocating heat engine with hot cylinder head and cold cylinder 1 according to the invention also comprises cylinder casing cooling means 9 which consist, for example, of a cooling chamber 27 which envelops the cooled cylinder casing 5 while a heat transfer liquid 32 can circulate in said chamber 27, said means 9 cooling the cooled cylinder casing 5 so as to maintain all or part of the internal surface of the cold cylinder 6 at a sufficiently low temperature such that the lubricant film 7 does not age prematurely, coke or burn.

In FIGS. 1 to 10, it has been shown that the reciprocating heat engine with hot cylinder head and cold cylinder 1 according to the invention also comprises at least one hot cylinder head 10 which can comprise at least one intake valve 31 and at least one exhaust valve 33 which are controlled by a valve actuator 50.

The operating temperature of the hot cylinder head 10 is significantly higher than that of the cooled cylinder casing 5 which it covers in order to form with the piston 2, a hot of variable-volume chamber 11 which contains a working gas 17.

As can easily be seen in FIGS. 9 and 10, the hot cylinder head 10 is, on the one hand, held applied against the cooled cylinder casing 5 by cylinder head applying means 24 that leave it free to expand relative to said cylinder casing 5 and, on the other hand, it is located relative to said cylinder casing 5 by cylinder head centering means 39 that could consist, for example, of a centering pin or a bearing collar.

Furthermore, and as shown in FIG. 1 and in FIGS. 3 to 10, the reciprocating heat engine with hot cylinder head and cold cylinder 1 comprises at least one piston sealing ring 37 provided at the periphery of the piston 2, said ring 37 comprising, on the one hand, piston sealing means 30 consisting of, for example, compression rings 44 of cast iron or steel such as those usually found on the pistons of conventional automotive engines, said means 30 forming a sealing between the piston 2 and the cold cylinder 6, and, on the other hand, being cooled by sealing ring cooling means 38.

As shown in FIG. 1 and in FIGS. 3 to 10, the reciprocating heat engine with hot cylinder head and cold cylinder 1 according to the invention also comprises at least one hot crown 19 which is interposed between the hot variable-volume chamber 11 and the piston 2 and the operating temperature of which is significantly higher than that of the cooled cylinder casing 5.

As FIGS. 9 and 10 clearly illustrate, said crown 19 is, on the one hand, held applied against the piston 2 by crown applying means 23 that leave said crown 19 free to expand relative to said piston 2, and, on the other hand, it is located relative to said piston 2 by crown centering means 40 that could consist, for example, of a centering pin or a bearing collar.

In FIG. 1, in FIGS. 2 to 7, and in FIGS. 9 and 10, it can be seen that the reciprocating heat engine with hot cylinder head and cold cylinder 1 according to the invention can comprise sealed thermal insulation means 12 which are interposed between the cooled cylinder casing 5 and the hot cylinder head 10, said means 12 moreover being able—according to a particular embodiment—to form an integral part of the cooled cylinder casing 5 and/or of the hot cylinder head 10.

Likewise, and as can be seen in particular in FIGS. 9 and 10, thermal insulation means 22 can be interposed between the hot crown 19 and the piston 2, said means 22 possibly forming an integral part of the hot crown 19 and/or of the piston 2.

In FIG. 1, it has been shown that the thermal insulation means 22 can consist of a reflective screen 57 which returns to the hot crown 19, the heat which it emits in the direction of the piston 2, in particular in the form of radiation in the infrared.

It has also been shown in FIG. 1 that the thermal insulation means 22 can consist of a honeycomb or fibrous insulating material 58 that occupies all or part of the space lying between the hot crown 19 and the piston 2, said insulating material 58 possibly consisting of a porous ceramic, known per se, of low density.

It is also moreover noted that in this case, a reflective screen 57 can be bonded to the honeycomb or fibrous insulating material 58 so as to form a composite insulating part which, on the one hand, sends back the heat emitted by radiation from the hot crown 19 and, on the other hand, prevents the movements of gas between said crown 19 and the piston 2, said movements being such as to maximize the exchanges of heat between these two parts 19, 2 by convective forcing.

It is moreover noted in FIG. 1, as well as in FIGS. 3 to 7 and in FIGS. 9 and 10, that the sealed thermal insulation means 12 and/or the thermal insulation means 22 can consist of at least one insulating ring 13 made of a material 14 with low thermal conductivity, it being possible for said material 14 to mainly consist of zirconium oxide 15.

As shown particularly in FIGS. 1, 9 and 10, the insulating ring 13 which forms the sealed thermal insulation means 12 can be directly or indirectly in contact with the cooled cylinder casing 5 and/or the hot cylinder head 10 by means of at least one small surface contact edge 16 which prevents the working gas 17 from passing between the cooled cylinder casing 5 and the hot cylinder head 10.

As another variant of the reciprocating heat engine with hot cylinder head and cold cylinder 1 according to the invention, which can be particularly seen in FIGS. 1, 9 and 10, the insulating ring 13 which forms the thermal insulation means 22 can also be directly or indirectly in contact with the hot crown 19 and/or with the piston 2 by means of at least one small surface contact edge 16, this being to prevent the working gas 17 from passing between the hot crown 19 and the piston 2.

It is also noted in FIGS. 1, 9, and 10 that a cylinder head seal 18 can be interposed between the insulating ring 13 which forms the sealed thermal insulation means 12 and the cooled cylinder casing 5, and/or between said ring 13 and the hot cylinder head 10.

Similarly, a piston sealing seal 36 can be interposed between the insulating ring 13 which forms the thermal insulation means 22 and the hot crown 19 and/or between said ring 13 and the piston 2.

It is noted that the cylinder head seal 18 and/or the piston seal 36 can comprise a plurality of metal sheets, for example, as in the case of cylinder head gaskets in modern automotive internal combustion engines, or consist of materials that withstand high temperatures, such as the "Therma-pur" material developed by the company "Garlock".

It will also be noted that the hot cylinder head 10 and/or the hot crown 19 can entirely or in part consist of a material resistant to high temperatures 20, it being possible for the latter to mainly consist of silicon carbide 21.

According to a variant of the reciprocating heat engine hot cylinder head and cold cylinder 1 according to the invention, which can be particularly seen in FIGS. 9 and 10, the hot cylinder head 10 can have a concave conical cylinder head surface 25 by means of which said cylinder head 10 is held applied by the cylinder head applying means 24 against a circular cylinder contact edge 51 provided on the cooled cylinder casing 5.

In this case, the angle of the concave cone formed by said surface 25 is such that when said surface 25 slides on said edge 51 due to the difference between the thermal expansion of said cylinder head 10 and that of said cylinder casing 5, the axial distance which separates the bearing point of the cylinder head applying means 24 on the hot cylinder head 10 from the cooled cylinder casing 5 remains approximately constant, all else being equal, while the concave conical surface of the cylinder head 25 and the circular cylinder edge contact 51 form the cylinder head centering means 39.

It will be noted that this particular configuration of the reciprocating heat engine with hot cylinder head and cold cylinder 1 according to the invention makes it possible for the force to which the cylinder head applying means 24 are subjected to remain approximately constant whatever the difference between the thermal expansion of the hot cylinder head 10 and that of the cooled cylinder casing 5, said difference resulting both from a temperature and from a thermal expansion coefficient which are possibly different between those of the hot cylinder head 10 and those of the cooled cylinder casing 5.

Furthermore, said configuration makes it possible to limit the variation in the volumetric ratio of the reciprocating heat engine with hot cylinder head and cold cylinder 1 according to its temperature, in particular during cold start phases of said engine 1.

It is noted that advantageously, the circular cylinder contact edge 51 can have a spherical contact with the cylinder head concave conical surface 25.

As another variant of the reciprocating heat engine with hot cylinder head and cold cylinder 1 according to the invention, which can be particularly seen in FIGS. 9 and 10, the hot crown 19 can also have a concave conical crown surface 26 by means of which said crown 19 is held applied by the crown applying means 23 against a piston circular contact edge 52 formed on the piston 2.

In this case, the angle of the concave cone which forms said surface 26 is such that, when said surface 26 slides on said edge 52 due to the difference between the thermal expansion of said crown 19 and that of the piston 2, the axial distance which separates the bearing point of the crown applying means 23 on said hot crown 19 from the piston 2 remains approximately constant, all else being equal, while the concave conical surface of the crown 26 and the piston circular contact edge 52 form the crown centering means 40.

It is noted that this particular configuration of the reciprocating heat engine with hot cylinder head and cold cylinder 1 according to the invention makes it possible for the force to which the crown applying means 23 are subjected to remain approximately constant regardless of the difference between the thermal expansion of the hot crown 19 and that of the piston 2.

Furthermore, said configuration makes it possible to limit the variation in the volumetric ratio of the reciprocating heat engine with hot cylinder head and cold cylinder 1 according to its temperature, in particular during cold start phases of said engine 1.

It is noted that advantageously, the piston circular contact edge 52 can have a spherical contact with the concave conical crown surface 26.

As shown in FIG. 1, as a variant of an embodiment of the reciprocating heat engine with hot cylinder head and cold cylinder 1 according to the invention, the hot crown 19 can have, at its periphery, an aerodynamic passivation bead 53 which limits the turbulence of the working gas 17 in the vicinity of the cold cylinder 6 and which, as a result, limits the convective forcing which increases the loss, on the one hand, of the heat of said gas 17 by transfer of said heat to said cold cylinder 6.

FIG. 1 also illustrates that the outside of the hot cylinder head 10 can be covered with a thermal insulation 41 that prevents the heat of said cylinder head 10 from dissipating into the environment of the reciprocating heat engine with hot cylinder head and cold cylinder 1 according to the invention.

Said thermal insulation 41 can, for example, consist of several layers of thin metal sheets comprising spikes which leave an air blade between each said sheet, or be any other thermal insulation 41 known to a person skilled in the art.

It can be seen in FIG. 1, in FIGS. 2 to 7, and in FIGS. 9 and 10, that the piston sealing ring 37 can have piston guide means 29 consisting of an annular sliding surface 43 that has a barrel shape in contact with the cold cylinder 6, said shape being able to be positioned between two compression segments 44 and for being adjacent to an oil scraper segment 45.

According to a particular configuration of the reciprocating heat engine with hot cylinder head and cold cylinder 1 according to the invention shown in FIGS. 2 to 10, the cooled cylinder casing 5 can be held clamped between a lower hot cylinder head 10 and an upper hot cylinder head 10 by the cylinder head applying means 24, while the piston 2 is double-acting and comprises, on the one hand, a lower piston rod 46 which connects it to the power transmission means 3 and which passes right through the lower hot cylinder head 10 via a lower rod orifice 47, and, on the other hand, a lower hot crown 19 and an upper hot crown 19 in order to define, with the lower and upper hot cylinder heads 10, a lower variable-volume hot chamber 11 and an upper variable-volume hot chamber 11.

Still according to this particular configuration, the reciprocating heat engine with hot cylinder head and cold cylinder 1 according to the invention comprises at least one recessed pillar 101 which can be either completely closed or perforated, said pillar 101 being passed from one side to the other in the lengthwise direction by a rod tunnel 102.

In this case, a first pillar end 103 of the recessed pillar 101 rests directly or indirectly on the transmission casing 42 while a second pillar end 104 of said pillar 101 supports the lower hot cylinder head 10, said first end 101 being able to pivot about a ball joint 105 and/or bend relative to said casing 42 while said second end 104 is able to pivot about a ball joint 105 and/or bend relative to said lower hot cylinder head 10.

It will be noted that the pivoting of said ends 103, 104 can take place either by means of a mechanical connection of the pivot or cardan type or a ball joint 105, or by the bending of all or part of the recessed pillar 101, or by both.

According to a particular embodiment of the reciprocating heat engine with hot cylinder head and cold cylinder 1 according to the invention, the recessed pillar 101 can be made of zirconium dioxide called "zirconia", this ceramic offering good mechanical strength at high temperature, low thermal conductivity, and an expansion coefficient close to that of steel.

Still in this case, at least one traction rod 106 forms the cylinder head applying means 24, said rod 106 being housed, at least in part, in the rod tunnel 102, a first rod end 107 of said rod 106 being secured directly or indirectly to the transmission casing 42 while a second rod end 108 of said rod 106 is secured directly or indirectly to the upper hot cylinder head 10, said first end 107 being able to pivot about a ball joint 105 and/or bend relative to said casing 42 while said second end 108 is able to pivot about a ball joint 105 and/or bend relative to said cylinder head 10, it therefore being possible for said ends 107, 108 to pivot either by means of a mechanical connection of the pivot or cardan type or by means of a ball joint 105, or by bending all or part of the traction rod 106, or by both.

As shown in FIG. 8, it can be seen that in order to be secured to the upper hot cylinder head 10, the second end of the rod 19 can pass through an lug orifice 144 which consists of a fixing lug 117 that said cylinder head 10 has, while either a rod head 145 or a rod nut 147 which is screwed onto a rod thread 146 which is provided on the traction rod 106 bears against said lug 117.

It is moreover noted in FIG. 8 that the first rod end 107 can also be secured to the transmission casing 42 by means of a rod head 145, or a rod nut 147 screwed onto a rod thread 146.

Alternatively, said rod thread 146 can be screwed into a tapping directly or indirectly made in the transmission casing 42.

According to a particular embodiment of the double-acting expansion cylinder 1 according to the invention, a compression spring 148 can be interposed either between the rod head 145 or the rod nut 147 and the fixing lug 117, or between said head 145 or any other tapped part into which the rod thread 146 is screwed, and any other bearing part.

As illustrated in FIG. 8, said spring 148 can consist of one or more "Belleville" washers.

Such a spring 148 can, in particular, limit the tension to which the traction rod 106 is subjected when the various members that it holds clamped together expand under the effect of their temperature rise.

Still in the case shown in FIGS. 2 to 10, in which the cooled cylinder casing 5 is held clamped between a lower hot cylinder head 10 and an upper hot cylinder head 10, while the piston 2 is double-acting, the reciprocating heat engine with hot cylinder head and cold cylinder 1 according to the invention comprises lower cylinder head centering means 109 which are secured to the transmission casing 42 and which bear directly or indirectly on the lower hot cylinder head 10, said means 109 leaving said cylinder head 10 free to move over a short distance parallel to the longitudinal axis of the cold cylinder 6 and relative to the transmission casing 42, but preventing said cylinder head 10 from moving in the plane perpendicular to said axis relative to said casing 42.

Similarly, upper cylinder head centering means 110 secured to a centering gantry 127 which is rigidly fixed to the transmission casing 42 bear directly or indirectly against the upper hot cylinder head 10, said means 109 leaving said cylinder head 10 free to move a short distance parallel to the longitudinal axis of the cold cylinder 6 and relative to the transmission casing 42, but preventing said cylinder head 10 from moving in the plane perpendicular to said axis relative to said casing 42.

In this case, as can be seen in FIGS. 2, 3, 7 and 8, a rod cooling tube 111 can sealingly envelop the traction rod 106 over all or part of the length of said rod 106, a heat transfer liquid 32 coming from a cooling liquid source 113 being able to circulate in a space left between the inner wall of said tube 111 and the outer surface of said rod 106, while the largest possible portion of the outer surface of said tube 111 does not touch the inner wall of the rod tunnel 102 so as to define therewith a space which is empty or filled with atmospheric air, or which is filled with a gas of any kind.

Thus, the heat transfer liquid 32 can cool the traction rod 106 and maintain it at a sufficiently low temperature such that the constituent material of said rod 106 retains its highest mechanical features, while the empty space left between the outer surface of the rod cooling tube 111 and the inner wall of the rod tunnel 102 limits the cooling of the recessed pillar 101.

It is noted that according to a particular embodiment of the reciprocating heat engine with hot cylinder head and cold cylinder 1 according to the invention, only a rod head 145 that the traction rod 106 can have could be cooled, said head 145 being in direct or indirect contact with the upper hot cylinder head 10.

As has been clearly shown in FIG. 8, at least one first tube supply orifice 114 can communicate with the inside of the rod cooling tube 111 in the vicinity of the first rod end 107, and at least one second tube supply orifice 115 can communicate with the inside of the rod cooling tube 111 in the vicinity of the second rod end 108, the heat transfer liquid 32 being able to circulate between the two said orifices 114, 115, while said liquid 32 is colder when it penetrates into the rod cooling tube 111 than when it leaves it.

It is noted that a fluid pump can be provided to force the heat transfer liquid 32 to circulate in the rod cooling tube 111, said pump being able to continue to operate for a certain time after the thermal machine to which the reciprocating heat engine with hot cylinder head and cold cylinder 1 according to the invention applies has stopped.

This latter arrangement makes it possible, for example, to discharge the heat that the lower and upper hot cylinder head 10 are capable of continuing to transmit, during their cooling, to the traction rod 106.

It is noted that, once removed from the rod cooling tube 111, the heat transfer liquid 32 can be cooled by a heat exchanger before being reintroduced into said tube 111, or renewed.

In FIG. 8, it is noted that the rod cooling tube 111 can comprise a tube collar 116 which is held directly or indirectly clamped by the traction rod 106 either against a fixing lug 117 that the upper hot cylinder head 10 has, or against the transmission casing 42.

In this context, the tube collar 116 can be held clamped by the traction rod 106 against the fixing lug 117 by means of a Banjo coupling 118 which comprises at least one radial coupling duct 119 which is connected, on the one hand, to the cooling liquid source 113 and which communicates, on the other hand, with the inside of the rod cooling tube 111.

It is noted that the radial coupling duct 119 can be connected to the cooling liquid source 113 or to other radial coupling ducts 119 that the Banjo coupling 118 comprises for other rod cooling tubes 111 by means of a flexible or deformable duct that can accommodate variations in distance which are induced by the thermal expansion of the various members that consists of the reciprocating heat engine with hot cylinder head and cold cylinder 1 according to the invention.

Still in this context and as shown in FIG. 8, a thermal insulation riser 120 can be interposed between the tube collar 116 and the fixing lug 117, said riser 120 being passed right through in the lengthwise direction by a riser tunnel 121 in which the traction rod 106 and the rod cooling tube 111 which sealingly envelops it are housed, while the largest possible part of the outer surface of said tube 111 does not touch the inner wall of the riser tunnel 121 so as to define with this latter wall a space which is empty or filled with atmospheric air, or filled with a gas of any kind.

It is noted that the thermal insulation riser 120 can advantageously be made of a material which is resistant to high temperatures and that offers low thermal conductivity, such as zirconium dioxide.

FIG. 8 also shows that according to a variant of an embodiment of the reciprocating heat engine with hot cylinder head and cold cylinder 1 according to the invention, the rod cooling tube 111 can comprise at least one tube bulge 122 consisting of an axial portion of said tube 111 the free diameter of which is substantially equivalent or even slightly greater than that of the rod tunnel 102 in which it is housed, which makes it possible to center said tube 111 in said tunnel 102 or even to perform a sealing locally between said tube 111 and said tunnel 102.

Conversely, the rod cooling tube 111 can comprise at least one tube diameter restriction 123 consisting of an axial portion of said tube 111, the free diameter of which is substantially equivalent to, or even slightly smaller than the diameter of the body of the traction rod 106, thereby enabling said tube 111 to be centered around said rod 106, or even enabling sealing to be performed locally between said tube 111 and said rod 106.

It is noted that, alternatively or complementarily and as is clearly shown in FIG. 8, the rod cooling tube 111 can receive at least one elastomer or plastic tube seal 157 in order to improve the sealing formed between said tube 111 and the rod tunnel 102.

As a variant not shown, the traction rod 106 could be hollow so as to form an internal rod cooling channel provided along the length of said rod 106, said channel opening out axially or radially in the vicinity of each end of said rod 106, while a heat transfer liquid 32 coming from a source of cooling liquid 113 could circulate in said channel, in order to cool the traction rod 106 and to maintain it at a sufficiently low temperature such that the constituent material of said rod 106 retains its highest mechanical features.

As illustrated in FIGS. 4, 6 and 7, a piston cooling and lubricating chamber 125 connected to a lubricating-cooling fluid source 126 can be fixed to the centering gantry 127 or made on or in the latter, while an upper piston rod 128 that extends the double-acting piston 2 on the side of the upper variable-volume hot chamber 11 passes through the upper hot cylinder head 10 via an upper rod orifice 129 provided in said cylinder head 10 and via an access orifice to the cooling and lubricating chamber 130 passing through the centering gantry 127 to open out into the piston cooling and lubricating chamber 125 such that the end of the upper piston rod 128 which is farthest from said piston 2 always remains immersed in said chamber 128 regardless of the position of said piston 2.

In this case, a lubricating-cooling fluid 139 can advantageously circulate from the piston cooling and lubricating chamber 125 to the transmission casing 42 by passing successively via an upper piston rod internal channel 140 provided longitudinally in the upper piston rod 128, via an internal piston cavity 141, and via a lower piston rod internal channel 142 provided longitudinally in the lower piston rod 46.

As can be seen in FIGS. 3, 9 and 10, the periphery of the internal piston cavity 141 can communicate with the external peripheral face of the piston sealing ring 37 via at least one peripheral ring lubrication orifice 143 which opens out axially between at least two piston sealing means 30, said orifice 143 consisting of the lubricating means 8 and the sealing ring cooling means 38.

FIG. 5 shows that the transmission casing 42 can be covered by a centering and sealing plate 131 pierced by an orifice for access to the transmission means 132 through which the lower piston rod 46 passes in order to be connected to the power transmission means 3, said plate 131 being rigidly fixed to said casing 42 by screws or by any other means known to a person skilled in the art.

Alternatively, said plate 131 can form an integral part of said casing 42.

As shown in FIG. 6, the access orifice to the cooling and lubricating chamber 130 can comprise rod sealing means 133 that provide sealing between said orifice 130 and the upper piston rod 128.

FIG. 5 shows that the access orifice to the transmission means 132 can comprise rod sealing means 133 providing a sealing between said orifice 132 and the lower piston rod 46.

In FIGS. 5 and 6, it is noted that the lower cylinder head centering means 109 and/or the upper cylinder head centering means 110 can consist of an resilient centering disk 134 which can be pierced at its center with a disk hole 135 through which the lower piston rod 46 or a upper piston rod 128 passes, respectively, while its periphery consists of a disk fixing collar 136 which is sealingly fixed respectively to the transmission casing 42 and/or to the centering gantry 127.

It is noted in FIG. 5 that the centering and sealing plate 131 can carry the lower cylinder head centering means 109 which consist of a resilient centering disk 134 the periphery of which forms a disk fixing collar 136 sealingly fixed on said plate 131, said disk 134 being pierced at its center with a disk hole 135 through which the lower piston rod 46 passes without touching said disk 134, the edge of the disk hole 135 having a circular contact pad 137 which is held in sealed contact with a centering and sealing cone 138 that the lower hot cylinder head 10 has, said cone 138 possibly being male or female, and the contact between said pad 137 and said cone 138 having the effect of deforming the resilient centering disk 134 axially and from its center.

It is noted that the disk fixing collar 136 can be fixed to the centering and sealing plate 131 by means of at least one screw, a clip, or any other fixing means which is known to a person skilled in the art.

It is noted that, advantageously, the resilient centering disk 134 can be made of a material which is resistant to high temperatures and that offers low thermal conductivity, such as zirconium dioxide.

As illustrated in FIG. 6, the upper cylinder head centering means 110 can consist of a resilient centering disk 134 of which the periphery forms a disk fixing collar 136 sealingly fixed to the centering gantry 127, said disk 134 being pierced in its center by a disk hole 135 of which the edge presents a circular contact pad 137 which is held in sealed contact with a centering and sealing cone 138 of the upper hot cylinder head 10, said cone 138 possibly being male or female, and the contact between said pad 137 and said cone 138 having the effect of deforming the resilient centering disk 134 axially and from its center.

It is noted that the disk fixing collar 136 can be fixed to the centering gantry 127 by means of at least one screw, a clip, or any other fixing means which is known to a person skilled in the art.

It is noted that if the double-acting piston 2 is extended by an upper piston rod 128, the latter passes right through the disk hole 135 without touching the resilient centering disk 134.

It is further noted that, advantageously, the resilient centering disk 134 can be made of a material which is resistant to high temperatures and that offers low thermal conductivity, such as zirconium dioxide.

It can also be noted that, alternatively to what has just been described, and whether it is the lower cylinder head centering means 109 or the upper cylinder head centering means 110, a contact pad similar to the contact pad that the disk hole 135 has can be provided on either the lower hot cylinder head 10 or on the upper hot cylinder head 10, respectively, while a centering and sealing cone similar to the cone that said cylinder heads 10 have is provided on or in the resilient centering disk 134.

It is noted that the centering and sealing function provided by the resilient centering disk 134 can be allocated, for example, to a split or non-split torus made of steel or a superalloy, to an expandable washer made up or not of multiple folds stacked radially and made of the same piece of metal or ceramic, to at least three needles pushed by a spring, distributed every hundred and twenty degrees and engaging with a sealing segment, and generally to any solution capable of ensuring centering and sealing under the desired functional conditions while limiting heat losses from any hot piece to any cold part.

As shown in FIGS. 2 and 7, an anti-rotation connection 149 can directly or indirectly connect the lower hot cylinder head 10 and/or the upper hot cylinder head 10 and/or the cooled cylinder casing 5 to the centering gantry 127, said connection 149 being, for example, able to consist of a pin or a connecting rod, and preventing the assembly formed by said cylinder heads 10 and the cooled cylinder casing 5 from rotating about the longitudinal axis of the cold cylinder 6.

It is noted in FIG. 11 that according to the reciprocating heat engine with hot cylinder head and cold cylinder of the invention, the cylinder head applying means 24 can consist of at least one cylinder head applying screw 59 which is cooled by the cylinder casing cooling means 9, said screw 59 also possibly consisting of a stud that engages with a nut.

According to this particular configuration of the invention, a thermal insulation riser 120 can be interposed between a screw head 60 of the cylinder head applying screw 59 and the hot cylinder head 10, said riser 120 possibly consisting of a quartz or "Zirconia" tube which envelops the body of the cylinder head applying screw 59.

In this case, at least one compression spring 148 can be interposed between the screw head 60 and the thermal insulation riser 120, said spring 148 being able to be—as illustrated in FIG. 11—a washer of the "Belleville" type known per se.

OPERATION OF THE INVENTION

The operation of the reciprocating heat engine with hot cylinder head and cold cylinder 1 according to the invention is easily understood with reference to FIGS. 1 to 11.

Said engine 1 can comprise a single-acting piston 2 as shown in FIG. 1 or a double-acting piston 2 as shown in FIGS. 2 to 11. Said engine can perform a Beau de Rochas, Miller, Atkinson, Diesel cycle, or any other thermodynamic cycle known to a person skilled in the art.

In the particular embodiment of the reciprocating heat engine with hot cylinder head and cold cylinder 1 according to the invention shown in FIGS. 2 to 11, the piston 2 is a double-acting piston, while said engine 1 executes a regenerative Brayton cycle which is identical to the regenerative Brayton cycle performed by the transfer-expansion and regeneration heat engine according to patent No. WO2016120560.

In this particular context, the invention applies only to the expansion valve 28 of said engine 1, and the other members of the latter, such as one or more compressors, a burner, or a regenerative exchanger necessary for implementing the regenerative Brayton cycle, are not shown.

The object of the reciprocating heat engine with hot cylinder head and cold cylinder 1 according to the invention is to limit as much as possible the heat losses of the working gas 17 by bringing as much of the internal wall surface as possible of the expansion valve 28 to a high temperature, while at the same time enabling the piston 2 to achieve sealing with the cold cylinder 6 by making use of conventional piston sealing means 30, specifically compression segments 44 and an oil scraper segment 45 which are similar to those which are fitted to automotive internal combustion engines produced in large series.

It is noted, particularly in FIGS. 1, 3, 4 and 11, that according to the particular example of embodiment of the reciprocating heat engine with hot cylinder head and cold cylinder 1 according to the invention which is described therein, the power transmission means 3 which are housed in the transmission casing 42 are provided to transform the reciprocating movements that a double-acting piston 2 performs in the cold cylinder 6, into a continuous rotational movement of a crankshaft 35.

According to this non-limiting example of a particular embodiment of said engine 1 according to the invention, the transmission casing 42 and the power transmission means 3 are maintained at a temperature close to one hundred degrees Celsius.

In FIGS. 3, 4 and 11 and as an example of embodiment of the reciprocating heat engine with hot cylinder head and cold cylinder 1 according to the invention, it is noted, in this case, that the power transmission means 3 advantageously consist of a connecting rod 34 which is connected to the double-acting piston 2 by a crosshead 49 itself connected to said piston 2 by a lower piston rod 46, said connecting rod 34 being hinged, as illustrated in FIGS. 3 and 4, about a crank 48 provided on the crankshaft 35, the latter forming a power output shaft 4.

As can be seen clearly in FIGS. 3 and 4 and in FIGS. 5 and 6, the reciprocating heat engine with hot cylinder head and cold cylinder 1 according to the invention presented in this case has, for a same cold cylinder 6, a lower hot cylinder head 10 which forms, with the double-acting piston 2, a lower variable-volume hot chamber 11, and an upper hot cylinder head 10 which forms, with said piston 2, an upper variable-volume hot chamber 11.

As can be understood in FIGS. 3, 4, and 11, the cooled cylinder casing 5 is held axially clamped between the lower and upper hot cylinder heads 10, while the double-acting piston 2 receives a hot crown 19 on each of its lower and upper axial faces, said crowns 19 being interposed between said piston 2 and the variable-volume hot chamber 11 with which they engage.

It will be assumed, in this case, that the working gas 17 is introduced into the expansion valve 28 via an intake valve 31 at a temperature of one thousand three hundred degrees Celsius, while the operating equilibrium temperature of the hot cylinder heads 10 and the hot crowns 19 is of nine hundred and fifty degrees Celsius.

It is noted that, advantageously, the intake valve 31 and an exhaust valve 33 through which the working gas 17 is expelled from the expansion valve 28 after having been expanded therein are autoclaved, and can each be controlled by a regenerative hydraulic valve actuator 50 as described in U.S. Pat. No. 3,071,896 dated Oct. 11, 2019 and belonging to the applicant.

It is noted in FIG. 11 that said actuator receives, in addition to what is provided in U.S. Pat. No. 3,071,896, an input-output micro-accumulator 162.

The particular position of the hydraulic closing and regeneration motor 161 are also noted in FIG. 11, the latter being placed under the crankshaft 35.

The presence of a solenoid valve block 163 placed on the side of the reciprocating heat engine with hot cylinder head and cold cylinder 1 is also noted in FIG. 11, said block 163 housing pre-compression valves such as are necessary for the operation of the intake hydraulic valve actuators 50 comprised in the two expansion valves of said engine 1 according to FIG. 11, said valves being provided in U.S. Pat. No. 3,071,896 relating to said actuators 50.

Unlike the heat engine with transfer-expansion and regeneration according to patent No. WO2016120560, all the inner walls of which are maintained at a high temperature of, for example, of nine hundred and fifty degrees Celsius, the inner wall of the cold cylinder 6 of the expansion valve 28 of the heat engine 1 according to the invention is, in this case, maintained by cylinder casing cooling means 9 at the relatively low temperature of only one hundred degrees Celsius, this temperature being given only by way of example.

FIGS. 1, 3, 4, 9, 10 and 11 show that the cylinder casing cooling means 9 can consist of a cooling chamber 27 that envelops the outer surface of the cold cylinder 6, with a heat transfer liquid 32, in this case, water, circulating in said chamber 27.

Thus, and as is clearly shown in FIGS. 3, 6, 9, 10 and 11, practically all the internal walls of the expansion valve 28 of the reciprocating heat engine with hot cylinder head and cold cylinder 1 according to the invention remain hot, like those of the transfer-expansion and regeneration heat engine according to patent No. WO2016120560, with the exception of the cold cylinder 6.

In this respect, it is moreover noted that, in order to avoid any loss of heat, the expansion valve 28 shown in FIGS. 2, 3, 4, 7 and 11 comprises hinged intake plenums 159 and hinged exhaust plenums 159 that can be made of silicon carbide 21, said plenums 159 being provided according to the principle of patent No. FR 3094416 published on Mar. 5, 2021 and belonging to the applicant.

In this respect, FIGS. 2 to 4 and FIG. 11 clearly show that said plenums 159 are held applied, on the one hand, against the lower or upper hot cylinder heads 10, as the case may be, and, on the other hand, against gas collectors by resilient plenum flanges 158 held clamped by screws and resilient plenum flange springs 56.

This particular arrangement enables said plenums 159, which offer to the hot cylinder heads 10 and the manifolds a spherical bearing surface, to pivot freely about said cylinder heads 10 and said manifolds in order to allow the component parts of the reciprocating heat engine with hot cylinder head and cold cylinder 1 according to the invention to expand.

Likewise, it is noted in FIGS. 2, 3, 4, 7 and 11 that the reciprocating heat engine with hot cylinder head and cold cylinder 1 according to the invention and according to a non-limiting embodiment example, the valve actuators 50 are held applied against the hinged plenum 159 with which they engage by a resilient flange 54 of actuators and by resilient flange springs 55 of actuators in the case of said actuators 50 which control the intake valve 31 and the exhaust valve 33 of the upper variable-volume hot chamber 11, and by a resilient actuator pusher 160 in the case of said actuators 50 which control the intake valve 31 and the exhaust valve 33 of the lower variable-volume hot chamber 11.

It is moreover noted that the resilient actuator pushers 160 are telescopic and are pressurized by a nut which presses the "Belleville" washers. In this regard, the force produced by said pushers 160 is adjustable.

If, as has been stated above, practically all the internal walls of the expansion valve 28 remain hot, with the exception of the cold cylinder 6, the remaining hot surfaces are sufficient to obtain a thermodynamic efficiency of the regenerative Brayton cycle which is significantly higher in practice than that of the Otto and Diesel cycles.

It is noted in FIGS. 3, 4, 9, 10 and 11 that the piston guide means 29 and the piston sealing means 30 of the piston 2 are also maintained at a temperature of about one hundred degrees Celsius, close to that of the cold cylinder 6, in particular to preserve the integrity of the lubricant film 7 which covers the inner wall of said cylinder 6.

It is therefore understood that, unlike the transfer-expansion and regeneration heat engine of patent No. WO2016120560, the piston sealing means 30 no longer consist of a fluid cushion sealing device of patent No. FR 3032252, but rather by sealing segments comparable to those of conventional automotive internal combustion engines, said means 30 being cooled and lubricated in the same way.

This similarity enables the reciprocating heat engine with hot cylinder head and cold cylinder 1 according to the invention to benefit from knowledge which is more than 100 years old in the field of segmenting the pistons of internal combustion engines.

The particular configuration of said engine 1 is justified in that, under the temperature conditions which have just been described, the heat given up to the cold cylinder 6 by the working gas 17 forms an energy loss comparable or even less than that induced, on the one hand, by the fluid cushion sealing device which is the subject matter of patent No. FR 3032252 due to the compression means necessary for its supply with compressed air, and, on the other hand, by the regenerative cooling system according to patent No. EP 3585993 due to the additional pressure losses at the exhaust that it generates, and due to the reintroduction into the thermodynamic cycle of the heat extracted from the inner walls of the expansion valve via a regenerative heat exchanger, the efficiency of which is less than 1.

As proof of the validity of the reciprocating heat engine with hot cylinder head and cold cylinder 1 according to the invention, it is noted that if all the inner walls of the expansion valve 28 shown in FIGS. 3 to 7 and in FIGS. 9 to 11—including the lower and upper cylinder heads 10 and the hot crowns 19—were maintained at only one hundred degrees Celsius, like the inner walls of automotive internal combustion engines produced in large series, the average surface-specific heat output—for example, expressed in kilowatts per square meter—delivered by the working gas 17 to the cold cylinder 6 would be much lower than that delivered by said gas 17 to said hot cylinder heads 10 and to said hot crowns 19.

Indeed, the surface that the cold cylinder 6 exposes to the working gas 17 is small at the beginning of expansion of said gas 17, then increases as said gas 17 expands and as its temperature decreases, in contrast to the hot cylinder heads 10 and to the hot crowns 19, the surface of which exposed to the working gas 17 remains constant.

Thus, assuming that said cylinder heads 10 and said crowns 19 are deliberately maintained at one hundred degrees Celsius during expansion, the specific cooling power at the surface would be much lower at the inner walls of the cold cylinder 6 than at those of said cylinder heads 10 and of said crowns 19.

Furthermore, according to the particular configuration of the reciprocating heat engine with hot cylinder head and cold cylinder 1 shown in FIGS. 2 to 11, the piston 2 is double-acting and not single-acting, which minimizes the surface of the cold cylinder 6 relative to the combined surface of the hot cylinder heads 10 and the hot crowns 19.

Indeed, since the cold cylinder 6 is common to the lower and upper variable-volume hot chambers 11, its surface, in this case, is less than thirty percent of the total inner surface of the expansion valve 28 which comes into contact with the working gas 17.

It is also observed that at identical maximum power, the reciprocating heat engine with hot cylinder head and cold cylinder 1 according to the invention being provided with a double-acting piston 2 as shown in FIGS. 2 to 7 and in FIGS. 9 to 11, and executing a regenerative Brayton cycle, the inner surface of its cold cylinder 6 is smaller than the inner surface of the cylinder of a conventional Otto or Diesel cycle engine.

This reduces the relative heat losses attributable to said cold cylinder 6.

In addition, the maximum temperature reached by the gases in the cylinder of a conventional Otto or Diesel cycle engine is about two thousand five hundred degrees Celsius compared with only about one thousand three hundred degrees Celsius for the reciprocating heat engine with hot cylinder head and cold cylinder 1 executing a regenerative Brayton cycle.

All else being equal, this lower temperature further reduces the heat losses of the working gas 17 in contact with the cold cylinder 6.

Furthermore, it will be noted that unlike the hot cylinder heads 10 and the hot crowns 19, the cold cylinder 6 of the reciprocating heat engine with hot cylinder head and cold cylinder 1 according to the invention is located in a zone of low turbulence of the working gas 17 during the introduction of said gas 17 in either of the variable-volume hot chambers 11 via the corresponding intake valve 31, or during the expulsion of said gas 17 from said chamber 11 via the exhaust valve 33.

This low-intensity turbulence limits convective forcing and heat transfer by the working gas 17 to the cold cylinder 6.

It will moreover be noted that, unlike conventional Otto or Diesel cycle engines, the turbulence of the gases introduced into the expansion valve 28 does not need to be forced by movements which are known to a person skilled in the art as “tumble”, “swirl”, or “squish”, in order to promote any combustion whatsoever.

Indeed, insofar as the reciprocating heat engine with hot cylinder head and cold cylinder 1 according to the invention executes a regenerative Brayton cycle—which is its primary purpose—the combustion or heating of the working gas 17 is achieved by means of a hot source located upstream of the expansion valve 28 and not in said expansion valve 28, said source possibly consisting of a burner, a heat exchanger or, by way of non-limiting example, a solar radiation concentration sensor.

The absence of the need to create voluntary turbulence in order to promote combustion therefore further reduces the heat losses of the reciprocating heat engine with hot cylinder head and cold cylinder 1 according to the invention performing a regenerative Brayton cycle relative to those of a conventional Otto or Diesel cycle engine, due to less convective forcing between the working gas 17 and the inner wall of the cold cylinder 6.

This being described, in order to benefit from the advantages of the reciprocating heat engine with hot cylinder head and cold cylinder 1, it will be understood that said engine 1 involves causing hot parts and cold parts which are only a few millimeters apart to engage.

In order to demonstrate how the reciprocating heat engine with hot cylinder head and cold cylinder 1 according to the invention enables this engagement of hot parts and cold parts which are very close to one another, it will be assumed, in this case, that the cooled cylinder casing 5 is made of cast iron, while the hot cylinder heads 10 and the hot crowns 19 are made of silicon carbide 21, the body of the piston 2 being itself made of steel with high mechanical features.

It is reminded that the silicon carbide 21 retains its mechanical features up to temperatures of about one thousand four hundred degrees Celsius, and can be used in an oxidizing medium up to these high temperatures.

It will also be assumed, in this case, that the inner diameter of the cold cylinder 6 is equal to two hundred and forty millimeters.

The proximity of the hot and cold parts reveals a double challenge related to differential expansions, and to the limitation of heat losses.

For example, in the case of the upper hot cylinder head 10 of the reciprocating heat engine with hot cylinder head and cold cylinder 1 according to the invention, according to its particular configuration shown in FIGS. 2 to 11.

Said hot cylinder head 10 and the cold cylinder 6 with which it engages are both manufactured at a temperature of about twenty degrees Celsius.

Yet, in operation, the temperature of the cold cylinder 6 stabilizes at one hundred degrees Celsius, while that of the hot crown 10 stabilizes at nine hundred and fifty degrees Celsius.

Taking into account the expansion coefficients of the constituent materials of the hot cylinder head 10 and of the cold cylinder 6, these temperatures lead to differences in hot diameter between that of said hot cylinder head 10 and that of said cold cylinder 6 of almost one millimeter.

Likewise, under the effect of temperature, the total height of the lower and upper hot cylinder heads 10 also increases by about one millimeter, such a variation in height being difficult to absorb by the cylinder head applying means 24 which must also take up the axial forces generated by the pressure of the working gas 17 in the lower and upper variable-volume hot chambers 11.

Furthermore, the close proximity between the lower and upper hot cylinder heads 10 and the cold cylinder 6 is such as to promote heat transfers from said cylinder heads 10 to said cylinder 6, said transfers being detrimental to the thermodynamic efficiency of the regenerative Brayton cycle.

The reciprocating heat engine with hot cylinder head and cold cylinder 1 according to the invention serves both these needs, on the one hand, to absorb large differences in expansion between various parts which are held in contact with each other and that operate at very different temperatures and, on the other hand, to limit heat exchange between said parts.

Indeed, as can be seen in FIGS. 2 to 4 and in FIGS. 7 and 8, said engine 1 can comprise recessed pillars 101, for example made of stainless steel, which are passed right through in the lengthwise direction by a rod tunnel 102, a first pillar end 103 of said pillar 101 resting on the transmission casing 42 by means of a ball joint 105, while a second pillar end 104 of said pillar 101 supports the lower hot cylinder head 10, also by means of a ball joint 105.

The recessed pillars 101 being of great length, they form a thermal barrier and limit the transfer of heat by the lower cylinder head 10 to the transmission casing 42.

In FIGS. 1, 2, 7, and 8, the traction rods 106 that form the cylinder head applying means 24 can be seen, said rods 106 each being partially housed in the rod tunnel 102 of the recessed pillar 101 with which they engage, a first rod end 107 of each of said traction rods 106 being secured to the transmission casing 42 by means of a rod thread 146 and a rod nut 147, and by means of a compression spring 148 that in this case consist of a stack of Belleville washers.

It is noted that a rod cooling tube 111 sealingly envelops each traction rod 106 over the major part of its length, a heat transfer liquid 32 supplied by a cooling liquid source 113 at a temperature of around one hundred degrees Celsius circulating in a space left between the inner wall of said tube 111 and the outer surface of said rod 106, while the major portion of the outer surface of said tube 111 does not touch the inner wall of the rod tunnel 102 so as to engage with said wall to define an empty space.

As can be seen in FIG. 8, a first tube supply orifice 114 communicates with the inside of the rod cooling tube 111 in the vicinity of the first rod end 107, while a second tube supply orifice 115 communicates with the inside of the rod cooling tube 111 in the vicinity of the second rod end 108, the heat transfer liquid 32 being able to circulate between said two orifices 114, 115.

In FIG. 8, it has been shown that, according to the variant of an embodiment of the reciprocating heat engine with hot cylinder head and cold cylinder 1 according to the invention described, in this case, the rod cooling tube 111 can advantageously comprise a tube collar 116 held clamped by the traction rod 106 and by means of a thermal insulation riser 120 against a fixing lug 117 that the upper hot cylinder head 10 has.

As shown in FIG. 8, the tube collar 116 is, in this case, held clamped by the traction rod 106 against the fixing lug 117 by means of a Banjo coupling 118 which comprises a radial coupling duct 119 which is connected to the cooling liquid source 113, on the one hand, and which communicates with the inside of the rod cooling tube 111, on the other hand.

It is seen in FIG. 8 that the rod cooling tube 111 comprises a plurality of tube bulges 122 consisting of an axial portion of said tube 111 the free diameter of which is slightly greater than that of the rod tunnel 102 in which it is housed, thereby enabling said tube 111 to be centered in said tunnel 102.

In zone "D" of FIG. 8, it is seen that the rod cooling tube 111 comprises a first tube supply orifice 114 located between two tube bulges 122, said first orifice 114 communicating with the inside of the rod cooling tube 111 in the vicinity of first rod end 107, on the one hand, and being connected to a cooling liquid source 113, as shown in FIG. 1, via channels provided in the transmission casing 42, on the other hand.

On the side of the first rod end 107, it can be seen that the rod cooling tube 111 has a tube diameter restriction 123 consisting of an axial portion of said tube 111 the free diameter of which is slightly smaller than that of the body of the traction rod 106, thereby making it possible to center said tube 111 around said rod 106 and to provide sealing locally between said tube 111 and said rod 106.

Advantageously, said tube diameter restriction 123 can be completed by an elastomer tube seal 157 or replaced by the latter in order to guarantee perfect sealing between the traction rod 106 and the rod cooling tube 111.

Thus achieved, the traction rod 106 can operate at a temperature of around one hundred degrees Celsius whatever the temperature of the lower and upper hot cylinder heads 10, and be made of a steel with high mechanical features, without risk of soaking said steel.

In any case, this particular configuration, which makes it possible to cool the traction rod 106, may prove unnecessary if the latter is made of a material resistant to high temperatures such as "zirconia", silicon carbide, alumina or any superalloy specifically developed for this type of use.

Advantageously, the ball joints 105 which are in contact with the lower and upper hot cylinder heads 10 can be made of a material with very low thermal conductivity, such as zirconium oxide, in order to limit the passage of heat from the lower and upper hot cylinder heads 10 to the recessed pillars 101 and the traction rods 106.

As is noted in FIGS. 1, 2, 7, and 8, thermal insulation risers 120 can effectively be interposed between the traction rods 106 and the upper hot cylinder head 10, in order to reduce the flow of heat passing from said cylinder head 10 to the traction rods 106, the latter being in this case housed in a riser tunnel 121 which passes right through said risers 120 in the lengthwise direction.

This particular configuration is specified in FIG. 8, in which it is seen that each recessed pillar 101 actually has two ball joints 105 around which it is hinged.

It is noted in zone "D" of said FIG. 8 that a first ball joint 105 is interposed between the first pillar end 103 of said pillar 101 and the transmission casing 42, while zone "C" of the same FIG. 8 shows that a second ball joint 105 is interposed between the second pillar end 104 of said pillar 101 and the lower hot cylinder head 10.

FIG. 8 also shows that each recessed pillar 101 is effectively passed from one side to the other in the lengthwise direction by a rod tunnel 102 in which a traction rod 106 is housed.

As illustrated in zone "D" of said FIG. 8, the first rod end 18 of the traction rod 107 is secured to the transmission casing 42 by means of a first ball joint 105.

The zone "A" of FIG. 8 reminds that the second rod end 108 is indeed indirectly secured to the upper hot cylinder head 10 by means of a rod head 145, a ball joint 105, and a thermal insulation riser 120.

The rod head 145 holds the lower hot cylinder head 10 and the upper hot cylinder head 10 applied against the cooled cylinder casing 5, the latter being clamped between said two cylinder heads 10.

This is made possible, in particular, by fixing lugs 117 in said cylinder heads 10, said lugs 117 having a lug orifice 144 through which the traction rod 106 passes.

The zones "B" and "C" of FIG. 8 illustrate this arrangement in a particularly obvious manner.

Thus, the different ball joints 105 around which the four recessed pillars 101 and the traction rod 106 are hinged with which they engage enable the lower and upper hot cylinder heads 10 to expand freely, in particular relative to the transmission casing 42.

However, this can occur when the recessed pillars 101 transmit traction and compressive forces to said casing 42, said forces coming from the pressure exerted by the working gas 17 alternatively on the lower hot cylinder head 10 and on the upper hot cylinder head 10.

As is noted in FIGS. 9 and 10, the expansion of the lower and upper hot cylinder heads 10 has little or no effect on the total length of the assembly formed together by said cylinder heads 10 and the cooled cylinder casing 5.

This results from the fact that said cylinder heads 10 each have a concave conical cylinder head surface 25 by means of which said cylinder heads 10 are held applied by the traction rods 106 against a circular cylinder contact edge 51 provided on the cooled cylinder casing 5.

The angle of the concave cone formed by said surface 25 has been calculated beforehand, such that when said surface 25 slides on said edge 51 due to the difference between the thermal expansion of one or other of the cylinder heads 10 and that of said cylinder casing 5, the distance that separates the rod head 145 from the cooled cylinder casing 5 remains approximately constant, all else being equal.

Whatever the differential expansion between that of said lower and upper cylinder heads 10 and that of the cooled cylinder casing 5, the circular cylinder contact edge 51 and the respective concave conical cylinder head surfaces 25 of said cylinder heads 10 guarantee that the latter always remain centered on the cooled cylinder casing 5.

In this respect, the concave conical cylinder head surface 25 and the circular cylinder contact edge 51 form the cylinder head centering means 39 of the reciprocating heat engine with hot cylinder head and cold cylinder 1 according to the invention.

As clearly shown in FIGS. 9 and 10, the cylinder head centering means 39 and the insulating ring 13 which forms the sealed thermal insulation means 12 can form a single unit, the circular cylinder contact edge 51 forming an integral part of said ring 13, the latter consisting of a thermal barrier that drastically limits heat transfers from the hot cylinder heads 10 to the cooled cylinder casing 5.

It is noted that the advantageous arrangements which have just been described can function correctly only with the lower cylinder head centering means 109 integral with the transmission casing 42 which can be particularly seen in FIG. 5, and with the upper cylinder head centering means 110 as shown in FIG. 6 which are also integral with said casing 42 via a centering gantry 127 rigidly fixed to said casing 42.

Said means 109, 110 ensure centering and parallelism relative to the transmission casing 42 of the assembly formed by the lower and upper hot cylinder heads 10 and the cooled cylinder casing 5.

Said means 109, 110 each consist of a resilient centering disk 134 pierced at its center by a disk hole 135 through which the lower piston rod 46 passes without touching said disk 134 on the side of the lower hot cylinder head 10, and an upper piston rod 128 on the same side as the upper hot cylinder head 10.

As can be seen in FIGS. 5 and 6, the periphery of the resilient centering disks 134 forms a disk fixing collar 136 which is sealingly fixed either to the transmission casing 42 or to the centering gantry 127, as the case may be.

FIGS. 5 and 6 show that the edge of the disk hole 135 has a circular male contact pad 137 which is held in sealed contact with a female centering and sealing cone 138 that the lower and upper hot cylinder heads 10 have, the contact between said pad 137 and said cone 138 having the effect of slightly deforming the centering resilient disk 134 axially from its center and in its range of elasticity, and of preventing the working gas 17 contained in the lower and upper variable-volume hot chambers 11 from escaping from said chambers 11.

FIGS. 5 and 6 show the relatively large radial length left on the resilient centering disk 134 between its disk fixing collar 136 and its contact pad 137.

This length is necessary such that said disk 134 can deform without damage axially from its center, and is also useful for limiting, as much as possible, the transfer of heat from the centering and sealing cone 138 to said collar 136.

In this respect, the body of the resilient centering disk 134 is preferably of small thickness, and can be made of zirconium oxide or quartz, materials known for their low thermal conductivity.

It will also be noted that the narrow linear contact made between the centering and sealing cone 138 and the contact pad 137 also consists in itself of an effective thermal barrier.

According to this particular configuration of the reciprocating heat engine with hot cylinder head and cold cylinder 1 according to the invention, the assembly formed by the lower and upper hot cylinder heads 10 and the cooled cylinder casing 5 can substantially expand longitudinally or move relative to the transmission casing 42 over a very short distance parallel to the longitudinal axis of the cold cylinder 6, but said assembly can, in no case, move in the plane perpendicular to said axis relative to said casing 42.

FIGS. 2 and 7 also show the anti-rotation connection 149 which connects the cooled cylinder casing 5 to the centering gantry 127, in order to prevent said assembly from rotating about the longitudinal axis of the cold cylinder 6.

As can be seen in FIG. 5, the resilient centering disk 134 of the lower hot cylinder head 10 engages with a centering and sealing plate 131 which is rigidly fixed to the transmission casing 42, said plate 131 being pierced by an orifice for access to the transmission means 132 through which the lower piston rod 46 passes in order to be connected to the power transmission means 3.

It is noted that the orifice for access to the transmission means 132 comprises rod sealing means 133 that, in this case, are in the form of two cut segments 150 which are held applied against each other by a segment applying spring 156 and the cuts of which are offset, said segments 150 providing sealing between said orifice 132 and the lower piston rod 46.

As is seen in FIG. 6, the resilient centering disk 134 of the upper hot cylinder head 10 is secured to the centering gantry 127 which has an orifice for access to the cooling and lubricating chamber 130 through which the upper piston rod 128 passes to open out into a piston cooling and lubricating chamber 125 connected to a lubricating and cooling fluid source 126.

In FIG. 6, it is noted that the access orifice to the cooling and lubricating chamber 130 also has rod sealing means 133 which also take the form of two cut segments 150 the cuts of which are offset, said segments 150 also being held applied against each other by a segment applying spring 156.

As can be easily understood from FIGS. 5 and 6, the lower piston rod 46 and the upper piston rod 128 are respectively lubricated, sealed and cooled by lubricant that resides and/or circulates in the transmission casing 42 and in the piston cooling and lubricating chamber 125.

As shown in FIGS. 9 and 10, the principles that prevail at the lower and upper cylinder heads 10 and at the cooled cylinder casing 5 are also found at the double-acting piston 2.

It is noted in said figures that the piston sealing ring 37 which is provided at the periphery of the piston 2 has piston sealing means 30, in this case formed by piston rings 151 which are similar to those of conventional spark-ignition or compression internal combustion engines.

The piston sealing ring 37 is maintained at a temperature of around one hundred degrees Celsius by a lubricating-cooling fluid 139—in this case oil—which circulates from the piston cooling and lubricating chamber 125 to the transmission casing 42, passing respectively via an upper piston rod internal channel 140 provided longitudinally in the upper piston rod 128, via an internal piston cavity 141, and via a lower piston rod internal channel 142 provided longitudinally in the lower piston rod 46.

It must be noted that when the reciprocating heat engine with hot cylinder head and cold cylinder 1, as described, in this case, by way of example, stops, the lubricating-cooling fluid source 126, which causes the lubricating-cooling fluid 139 to circulate from the piston cooling and lubricating chamber 125 to the transmission casing 42 via the internal piston cavity 141, can continue to cause said fluid 139 to circulate in order to cool the constituent members of the double-acting piston 2, as long as the hot cylinder heads 10 and the lower and upper hot crowns 19 continue to transmit heat to said members and run the risk of bringing the lubricating-cooling fluid 139 contained in said members to a coking or even combustion temperature.

It is noted, particularly in FIGS. 9 and 10, that the periphery of the internal piston cavity 141 communicates with the external peripheral face of the piston sealing ring 37 via peripheral ring lubrication orifices 143 that open out axially between two piston rings 151, while said orifices 143 form both the lubricating means 8 and at least part of the sealing ring cooling means 38.

It is noted that the piston sealing ring 37 has, between the two piston rings 151, piston guide means 29 which guide the piston 2 in the cold cylinder 6, said means 29 in this case consisting of an annular sliding surface 43 of barrel shape which promotes hydrodynamic lift of the lubricant film 7 interposed between said surface 43 and said cylinder 6.

It is also noted—as can be easily seen in FIGS. 5, 6, 9 and 10—that an oil scraper segment 152 can advantageously be inserted between the annular sliding surface 43 and the piston ring 151 which is placed on the side of the lower variable-volume hot chamber 11, the peripheral ring lubrication orifices 143 opening out between two lips of said scraper segment 152.

The double function of the oil scraper ring 152 is to spread the lubricating-cooling fluid 139 over the inner wall of the cold cylinder 6, while recovering said fluid 139 present in excess on said wall.

As can be clearly seen in FIGS. 9 and 10, the lower and upper hot crowns 19 have a concave conical crown surface 26 via which they are each held applied by the crown applying means 23 against a circular piston contact edge 52 provided on the piston 2.

It is noted, particularly in FIGS. 3, 7, 9, and 10, that the crown applying means 23, in this case, consist of an axial double-acting piston screw 153 which, on the one hand, fixes the double-acting piston 2 on the crosshead 49 and, on the other hand, applies the lower and upper hot crowns 19 on the piston sealing ring 37 via crown applying tubes 154 and crown applying springs 155, said springs 155 in this case consisting of a stack of "Belleville" washers.

FIGS. 9 and 10 show that, whether it is the lower or upper hot crown 19, the angle of the concave cone formed by the concave conical crown surface 26 has been calculated beforehand, such that when said surface 26 slides on the circular piston contact edge 52 with which it engages, due to the difference between the thermal expansion of said crown 19 and that of the piston 2, the distance which separates the head of the axial double-acting piston screw 153 from the bearing point of the crown applying means 23 on the hot crown 19 remains approximately constant, all else being equal, such that the crown applying springs 155 are neither more compressed nor more expanded.

Thus, all else being equal, the traction force to which the axial double-acting piston screw 153 is subjected remains approximately constant regardless of the difference in thermal expansion between that of the lower and upper hot crowns 19 and that of the piston 2.

According to this particular configuration of the reciprocating heat engine with hot cylinder head and cold cylinder 1 according to the invention, the concave conical crown surface 26 and the circular piston contact edge 52 form the crown centering means 40.

It is be noted that the reciprocating heat engine with hot cylinder head and cold cylinder 1 according to the invention shown in FIG. 11 uses the principles described above, with the exception that the cooled cylinder casing 5 is not suspended on recessed pillars 101 as shown in FIGS. 2, 3, 4, 7 and 8, but is fixed directly to the transmission casing 42.

According to this particular configuration of the reciprocating heat engine with hot cylinder head and cold cylinder 1 according to the invention, the cylinder head applying means 24 are formed by a cylinder head applying screw 59 which, as the case may be, holds the lower or upper hot cylinder head 10 applied on the cooled cylinder casing 5 by means of a thermal insulation riser 120 for example made of quartz, a ceramic with low thermal conductivity.

It is noted in FIG. 11 that, in this case, a compression spring 148, possibly consisting of a stack of "Belleville" type resilient washers, is advantageously inserted between the screw head 60 of the cylinder head applying screw 59, and the thermal insulation riser 120 with which it engages.

The possibilities of the reciprocating heat engine with hot cylinder head and cold cylinder 1 according to the invention are not limited to the applications which have just been described, and it must moreover be understood that the above description has been given by way of example only and that it in no way limits the field of said invention from which it would not be possible to depart by replacing the details of execution described by any other equivalent.

The invention claimed is:

1. A reciprocating heat engine with a hot cylinder head and a cold cylinder comprising a cooled cylinder casing in which is arranged at least one cold cylinder in which a piston oriented and/or located by piston guide means can move in translation, said piston being directly or indirectly connected by power transmission means housed in a transmission casing to at least one rotary or reciprocating power output shaft, comprising:

lubricating means which form a lubricant film which is interposed between the cold cylinder and the piston;

cylinder casing cooling means which cool the cooled cylinder casing so as to maintain all or part of the internal surface of the cold cylinder at a sufficiently low temperature such that the lubricant film does not age prematurely, coke, or burn;

at least one hot cylinder head, the operating temperature of which is significantly higher than that of the cooled cylinder casing that the at least one hot cylinder head covers so as to form, with the piston, a hot chamber of variable-volume that contains a working gas, said cylinder head being both held applied against the cooled cylinder casing by cylinder head applying means that leave said cylinder head free to expand relative to said cylinder casing, and also located relative to said cylinder casing by cylinder head centering means;

at least one piston sealing ring arranged at the periphery of the piston, said ring comprising piston sealing means which form a seal between the piston and the cold cylinder, and said ring being cooled by sealing ring cooling means;

at least one hot crown which is interposed between the variable-volume hot chamber and the piston and the operating temperature of which is significantly higher than that of the cooled cylinder casing, said crown being held applied against the piston by crown applying means which leave said crown free to expand relative to said piston, and, said crown being located relative to said piston by crown centering means.

2. The reciprocating heat engine according to claim 1, wherein sealed thermal insulation means are interposed between the cooled cylinder casing and the hot cylinder head.

3. The reciprocating heat engine according to claim 1, wherein thermal insulation means are interposed between the hot crown and the piston.

4. The reciprocating heat engine according to claim 3, wherein the thermal insulation means consist of a reflective screen.

5. The reciprocating heat engine according to claim 3, wherein the thermal insulation means consist of a honeycomb or fibrous insulating material that occupies all or part of the space between the hot crown and the piston.

6. The reciprocating heat engine according to claim 2, wherein the thermal insulation means consist of at least one insulating ring made of a low thermal conductivity material.

7. The reciprocating heat engine according to claim 6, wherein the low thermal conductivity material mainly consists of zirconium oxide.

8. The reciprocating heat engine according to claim 6, wherein the insulating ring which forms the sealed thermal insulation means is directly or indirectly in contact with the cooled cylinder casing and/or the hot cylinder head by means of at least one small surface contact edge which prevents the working gas from passing between the cooled cylinder casing and the hot cylinder head.

9. The reciprocating heat engine according to claim 6, wherein the insulating ring which forms the thermal insulation means is directly or indirectly in contact with the hot crown and/or with the piston by means of at least one small surface contact edge.

10. The reciprocating heat engine according to claim 6, wherein a cylinder head seal is interposed between the insulating ring which forms the sealed thermal insulation means and the cooled cylinder case and/or between said ring and the hot cylinder head.

11. The reciprocating heat engine according to claim 6, wherein a piston seal is interposed between the insulating ring which forms the heat insulating means and the hot crown and/or between said ring and the piston.

12. The reciprocating heat engine according to claim 1, wherein the hot cylinder head and/or the hot crown are entirely or partly made of a high-temperature-resistant material.

13. The reciprocating heat engine according to claim 12, wherein the high-temperature resistant material mainly consists of silicon carbide.

14. The reciprocating heat engine according to claim 1, wherein the hot cylinder head comprises a concave conical cylinder head surface by means of which said cylinder head is held applied by the cylinder head applying means against a circular cylinder contact edge provided on the cooled cylinder casing, the angle of the concave cone formed by said surface being such that when said surface slides on said edge due to the difference between the thermal expansion of said cylinder head and that of said cylinder casing, the axial distance which separates the bearing point of the cylinder head applying means against the hot cylinder head of the cooled cylinder casing remains approximately constant, all else being equal, while the concave conical cylinder head surface and the circular cylinder contact edge form the cylinder head centering means.

15. The reciprocating heat engine according to claim 1, wherein the hot crown has a concave conical crown surface by means of which said crown is held applied by the crown applying means against a piston circular contact edge provided on the piston, the angle of the concave cone formed by said surface being such that when said surface slides on said edge due to the difference between the thermal expansion of said crown and that of the piston, the axial distance which separates the bearing point of the crown applying means on said hot crown of the piston remains approximately constant, all else being equal, while the concave conical crown surface and the piston circular contact edge form the crown centering means.

16. The reciprocating heat engine according to claim 1, wherein the hot crown has, at the hot crown's periphery, an aerodynamic passivation bead.

17. The reciprocating heat engine according to claim 1, wherein the outside of the hot cylinder head is covered with a thermal insulation.

18. The reciprocating heat engine according to claim 1, wherein the piston sealing ring has piston guide means consisting of an annular sliding surface.

19. The reciprocating heat engine according to claim 1, wherein the cooled cylinder casing is held clamped between a lower hot cylinder head and an upper hot cylinder head by the cylinder head applying means, while the piston is double-acting and comprises a lower piston rod which connects the piston to the power transmission means and which passes right through the lower hot cylinder head via a lower rod orifice, and, the piston comprising a lower hot crown and an upper hot crown in order to define, with the lower and upper hot cylinder heads, a lower variable-volume hot chamber and an upper variable-volume hot chamber.

20. The reciprocating heat engine according to claim 19, further comprising:

at least one recessed pillar passed right through in the lengthwise direction by a rod tunnel, a first pillar end of said pillar resting directly or indirectly on the transmission casing while a second pillar end of said pillar supports the lower hot cylinder head, said first end being able to pivot about a ball joint and/or bend relative to said casing while said second end is able to pivot about a ball joint and/or bend relative to said lower hot cylinder head;

at least one traction rod which forms the cylinder head applying means and which is, at least in part, housed in the rod tunnel, a first rod end of said traction rod being directly or indirectly secured to the transmission casing while a second rod end of said rod is directly or indirectly secured to the upper hot cylinder head, said first end being able to pivot about a ball joint and/or bend relative to said casing while said second end is able to pivot about a ball joint and/or bend relative to said cylinder head;

lower cylinder head centering means secured to the transmission casing and which bear directly or indirectly against the lower hot cylinder head, said means leaving said cylinder head free to move a short distance parallel to the longitudinal axis of the cold cylinder and relative to the transmission casing, but preventing said cylinder head from moving in the plane perpendicular to said axis relative to said casing;

upper cylinder head centering means secured to a centering gantry which is rigidly fixed to the transmission casing, said means bearing directly or indirectly against the upper hot cylinder head, and said means leaving said cylinder head free to move over a short distance parallel to the longitudinal axis of the cold cylinder and relative to the transmission casing, but preventing said cylinder head from moving in the plane perpendicular to said axis relative to said casing.

21. The reciprocating heat engine according to claim 20, wherein a rod cooling tube sealingly envelops the traction rod over all or part of the length of said rod, a heat transfer liquid coming from a cooling liquid source being able to circulate in a space left between the inner wall of said tube and the outer surface of said rod while the largest possible part of the outer surface of said tube does not touch the inner wall of the rod tunnel so as to define with the inner wall of the rod tunnel wall an empty space.

22. The reciprocating heat engine according to claim 21, wherein at least one first tube supply orifice communicates with the inside of the rod cooling tube in the vicinity of the first rod end, and at least one second tube supply orifice communicates with the inside of the rod cooling tube in the vicinity of the second rod end, the heat transfer liquid being able to circulate between said two orifices.

23. The reciprocating heat engine according to claim 21, wherein the rod cooling tube has a tube collar held directly or indirectly clamped by the traction rod either against a fixing lug that the upper hot cylinder head has or against the transmission casing.

24. The reciprocating heat engine according to claim 21, wherein the tube collar is held clamped by the traction rod against the fixing lug by means of a Banjo coupling which comprises at least one radial coupling duct which is connected to the cooling liquid source, and the at least one radial coupling duct communicating with the inside of the rod cooling tube.

25. The reciprocating heat engine according to claim 23, wherein a thermal insulation riser is interposed between the tube collar and the fixing lug, said riser being passed right through in the lengthwise direction by a riser tunnel in which the traction rod and the rod cooling tube which sealingly envelops the traction rod are housed, while the largest possible part of the outer surface of said tube does not touch the inner wall of the riser tunnel so as to define with the inner wall of the riser tunnel, an empty space.

26. The reciprocating heat engine according to claim 21, wherein the rod cooling tube comprises at least one tube bulge consisting of an axial portion of said tube the free diameter of which is substantially equivalent to or slightly greater than that of the rod tunnel in which the axial portion of said tube is housed.

27. The reciprocating heat engine according to claim 21, wherein the rod cooling tube comprises at least one tube diameter restriction consisting of an axial portion of said tube of which the free diameter is substantially equivalent to or even slightly smaller than that of the body of the traction rod.

28. The reciprocating heat engine according to claim 20, wherein the traction rod is hollow to form an internal rod cooling channel provided in the length of said rod, said channel opening out axially or radially in the vicinity of each end of said rod while a heat transfer liquid originating from a cooling liquid source can circulate in said channel.

29. The reciprocating heat engine according to claim 20, wherein a piston cooling and lubricating chamber connected to a lubricating-cooling fluid source is fixed to the centering gantry or made on or in the centering gantry, while an upper piston rod that extends the double-acting piston on the side of the upper variable-volume hot chamber passes through the upper hot cylinder head via an upper rod orifice provided in said cylinder head and via an access orifice to the cooling and lubricating chamber passing through the centering gantry to open out into the piston cooling and lubricating chamber such that the end of the upper piston rod which is farthest from said piston always remains immersed in said chamber regardless of the position of said piston.

30. The reciprocating heat engine according to claim 29, wherein a lubricating-cooling fluid can circulate from the piston cooling and lubricating chamber to the transmission casing by passing successively via an upper piston rod internal channel provided longitudinally in the upper piston rod, via an internal piston cavity, and via a lower piston rod internal channel provided longitudinally in the lower piston rod.

31. The reciprocating heat engine according to claim 30, wherein the periphery of the internal piston cavity communicates with the external peripheral face of the piston sealing ring via at least one peripheral ring lubrication orifice which opens out axially between at least two piston sealing means, said orifice consisting of the lubricating means.

32. The reciprocating heat engine according to claim 20, wherein the transmission casing is covered with a centering and sealing plate pierced with an orifice for access to the transmission means through which the lower piston rod passes in order to be connected to the power transmission means, said plate being rigidly fixed to said casing.

33. The reciprocating heat engine according to claim 29, wherein the access orifice to the cooling and lubricating chamber comprises rod sealing means providing a sealing between said orifice and the upper piston rod.

34. The reciprocating heat engine according to claim 30, wherein the access orifice to the transmission means comprises rod sealing means providing a sealing between said orifice and the lower piston rod.

35. The reciprocating heat engine according to claim 20, wherein the lower cylinder head centering means and/or the upper cylinder head centering means consist of a resilient centering disk which can be pierced at a center thereof with a disk hole through which the lower piston rod or an upper piston rod respectively passes, while resilient centering disk's periphery forms a disk fixing collar sealingly fixed respectively to the transmission casing and/or to the centering gantry.

36. The reciprocating heat engine according to claim 32, wherein the centering and sealing plate carries the lower cylinder head centering means which consist of a resilient centering disk, the periphery of which forms a disk fixing collar sealingly fixed to said plate, said disk being pierced at its center with a disk hole through which the lower piston rod passes without touching said disk, the edge of the disk hole having a circular contact pad which is maintained in sealed contact with a centering and sealing cone of the lower hot cylinder head, and the contact between said pad and said cone having the effect of deforming the resilient centering disk axially and from its center.

37. The reciprocating heat engine according to claim 20, wherein the upper cylinder head centering means consist of a resilient centering disk, the periphery of which forms a disk fixing collar sealingly fixed to the centering gantry, said disk being pierced at a center thereof with a disk hole, the edge of which has a circular contact pad which is held in sealed contact with a centering and sealing cone that the upper hot cylinder head has, and the contact between said pad and said cone having the effect of deforming the resilient centering disk axially and from its center.

38. The reciprocating heat engine as claimed in claim 20, wherein an anti-rotation connection directly or indirectly connects the lower hot cylinder head and/or the upper hot cylinder head and/or the cooled cylinder casing to the centering gantry.

39. The reciprocating heat engine according to claim 1, wherein the cylinder head applying means consist of at least one cylinder head applying screw which is cooled by the cylinder casing cooling means.

40. The reciprocating heat engine according to claim 39, wherein a thermal insulation riser is interposed between a screw head which the cylinder head clamping screw has and the hot cylinder head.

41. The reciprocating heat engine according to claim 40, wherein at least one compression spring is interposed between the screw head and the thermal insulation riser.

* * * * *